United States Patent
Watkins

(10) Patent No.: US 9,616,995 B2
(45) Date of Patent: Apr. 11, 2017

(54) AIRCRAFT AND METHODS FOR OPERATING AN AIRCRAFT

(71) Applicant: STOPROTOR TECHNOLOGY PTY LTD, New South Wales (AU)

(72) Inventor: Rowan John Watkins, New South Wales (AU)

(73) Assignee: STOPROTOR TECHNOLOGY PTY LTD, New South Wales (AU)

( * ) Notice: Subject to any disclaimer, the term of this patent is extended or adjusted under 35 U.S.C. 154(b) by 0 days.

(21) Appl. No.: 14/650,132

(22) PCT Filed: Dec. 6, 2013

(86) PCT No.: PCT/AU2013/001427
§ 371 (c)(1),
(2) Date: Jun. 5, 2015

(87) PCT Pub. No.: WO2014/089604
PCT Pub. Date: Jun. 19, 2014

(65) Prior Publication Data
US 2016/0046369 A1 Feb. 18, 2016

(30) Foreign Application Priority Data

Dec. 13, 2012 (AU) .............................. 2012905460
Apr. 4, 2013 (AU) .............................. 2013901152

(51) Int. Cl.
*B64C 27/22* (2006.01)
*B64C 27/24* (2006.01)
(Continued)

(52) U.S. Cl.
CPC ................ *B64C 27/24* (2013.01); *B64C 5/02* (2013.01); *B64C 5/08* (2013.01); *B64C 9/02* (2013.01);
(Continued)

(58) Field of Classification Search
CPC ........... B64C 27/24; B64C 27/26; B64C 5/02; B64C 5/16; B64C 9/02; B64C 9/06; B64C 9/10
(Continued)

(56) References Cited

U.S. PATENT DOCUMENTS 2,413,625 A * 12/1946 Hays ........................ B64C 5/16
244/17.19
3,273,339 A * 9/1966 Borysthen-Tkacz ................ B64C 29/0025
239/265.29
(Continued)

FOREIGN PATENT DOCUMENTS

WO WO 2010/005390 1/2010

*Primary Examiner* — Richard G Davis
(74) *Attorney, Agent, or Firm* — Knobbe Martens Olson & Bear LLP

(57) ABSTRACT

An aircraft (10) comprising a fuselage (12) having a longitudinal axis (16), at least one helicopter main rotor (40) operably mounted to the fuselage (12), the at least one helicopter main rotor (40) comprising rotor blades (41) rotatable about a rotation axis (44), wherein the rotor blades (41) can be stopped in flight and adapted to provide symmetrical wing surfaces relative to the longitudinal axis (16); and the aircraft (10) having at least one control surface (62, 82) operable to provide a relative airflow (306) in flight substantially aligned with the rotation axis (44) of the at least one helicopter main rotor (40).

21 Claims, 27 Drawing Sheets

(51) Int. Cl.
  *B64C 5/02* (2006.01)
  *B64C 5/08* (2006.01)
  *B64C 9/02* (2006.01)
  *B64C 27/26* (2006.01)
  *B64C 29/00* (2006.01)
  *B64C 39/12* (2006.01)

(52) U.S. Cl.
  CPC .......... *B64C 27/26* (2013.01); *B64C 29/0025* (2013.01); *B64C 39/12* (2013.01)

(58) Field of Classification Search
  USPC .................................................. 244/7 A, 7 R
  See application file for complete search history.

(56) References Cited

U.S. PATENT DOCUMENTS

| | | | |
|---|---|---|---|
| 5,758,844 A * | 6/1998 | Cummings | B64C 29/0033 244/12.4 |
| 6,669,137 B1 * | 12/2003 | Chen | B64C 3/40 244/7 R |
| 2007/0102575 A1 * | 5/2007 | Morgan | B64C 5/02 244/87 |
| 2009/0045294 A1 * | 2/2009 | Richardson | B64C 3/385 244/7 A |
| 2010/0230547 A1 | 9/2010 | Tayman | |

* cited by examiner

AIRCRAFT AND METHODS FOR OPERATING AN AIRCRAFT

RELATED APPLICATIONS

This application is the U.S. National Phase of PCT/AU2013/001427 filed Dec. 6, 2013 and claims priority to Australian Provisional Patent Application No. 2012905460 filed Dec. 13, 2012 and Australian Provisional Patent Application No. 2013901152 filed Apr. 4, 2013, which are hereby incorporated herein by reference in their entirety.

FIELD OF THE INVENTION

The present invention relates to an aircraft and methods of operating the aircraft.

BACKGROUND OF THE INVENTION

The dream of a machine that can take off vertically with the safety and efficiency of a helicopter, transition to wing borne, high speed flight and then return to rotary wing flight for vertical landing, has been around for as long as flight itself.

Helicopters are versatile aircraft that are capable of efficient vertical flight from unprepared locations, but they are limited in forward speed.

Aeroplanes can carry large payloads, are capable of high speed, efficient, long range and high altitude flight but are limited operationally to prepared surfaces and facilities requiring large areas of land.

The attempt to combine these two types of flight has led to many attempts by many inventors since the first aircraft flew in the early 1900's. A lot of advances were made in this field of research during the 1950's and 1960's, the key developments being summarised at www.vtol.org on the Vertical TakeOff and Landing (VTOL) Wheel.

Of all the machines that have been built and tested there are only a small number of VTOL types that have made it into production. There are the military jet VTOL aircraft like the Harrier and the Tilt Rotor Aircraft like the V22 Osprey, but none are a true blend of the helicopter and the aeroplane. The McDonnell Douglas Helicopter (Now Boeing) Canard Rotor Wing (CRW) aircraft is a recent example of an attempt to solve this problem.

The primary issue with all attempts to convert a rotorcraft (rotary wing aircraft) from rotary wing flight to fixed wing flight with the rotor stopped to act as a fixed wing is the asymmetric lift on the rotor blades generated by the forward motion of the aircraft. This lift asymmetry results in instability as the rotor is slowed to be stopped.

Many different design configurations have attempted to push rotorcraft performance beyond the limits imposed by conventional rotors. As any rotary wing aircraft starts to move forward, the asymmetric difference in airflow between the advancing blade and the retreating blade causes imbalances in lift which results in instability. For conventional helicopters, this asymmetry also limits their maximum speed.

Conventionally designed rotorcraft, with a rotor or rotors on top of a fuselage have pushed past the pure helicopter speed limitations with the addition of wings for lift augmentation, and, or an ability to produce forward thrust from a propulsion device that is separate from the rotor, thrust augmentation. These configurations are known as Compound Helicopters and allow the rotor to be relieved from the requirements to produce both lift and thrust, therefore allowing them to be unloaded as airspeed increases. Unloading the rotor has two main advantages; it allows slower RPM on the rotor and allows a reduction in the angle of attack on the rotor blades. The results of these changes mean a delay in the onset of transonic airflow on the advancing rotor blade and an increase in the margin before blade stall is encountered on the retreating blade, both of which mean the aircraft can fly faster before these issues again become limiting factors. The advantages of these configurations are outweighed by their design complexity, high total drag and power consumption which are far higher than a comparable fixed wing aircraft. None of these aircraft have ever moved beyond the prototype phase.

Tilt Rotors are unique machines which combine some of the capabilities of a helicopter and an aeroplane in the one machine. They are less efficient in the vertical flight role than a helicopter due to their high rotor loading, and are limited to turboprop aircraft speeds in forward flight. To achieve the full benefits and capabilities of both helicopters and fixed wing aircraft is a single machine requires an aircraft known as a Stop Rotor Aircraft.

A Stop Rotor Aircraft is capable of taking advantage of the efficient vertical flight characteristics of a helicopter as well as the high speed, high altitude and long range capability of a fixed wing aircraft. A Stop Rotor Aircraft is able to attain speeds and altitudes not possible with other rotorcraft like Autogiros, Helicopters, Compound Helicopters, Gyrodynes and Tilt-Rotors.

The prior art consists of two types of Stop Rotor Aircraft proposals, the conventionally designed machines, where the rotor's rotation axis is mounted substantially at 90 degrees to the longitudinal axis of the fuselage and the tail or nose sitters where the rotor's rotation axis is parallel to the longitudinal axis of the fuselage. In this context, conventionally designed machines are those with a conventionally designed fuselage that allows the machine to takeoff and land with its longitudinal axis substantially parallel with the earth's surface using wheels, skids, floats or skis.

Tail or nose sitters are machines designed in such a way that they are required to have their fuselage in a vertical orientation during takeoff and landing when operating in their rotary wing flight mode.

There have also been other design concepts proposed like retractable, foldable and stowed rotors, but none of these have flown successfully.

Two Types and Three Methods

Stop Rotor Aircraft prior art can be divided into two different configurations using three separate methods for achieving transition between flight modes. The two configurations include firstly the conventionally designed machines where the rotor's rotation axis is mounted at substantially 90 degrees to the longitudinal axis of the fuselage and secondly the unconventional design known as Tail or Nose Sitters with the rotors rotation axis aligned with the fuselage longitudinal axis. Typically conventionally designed machines are built to perform radial airflow conversions, with the airflow acting parallel to the rotor disc, and nose or tail sitter designed machines are built to perform axial airflow conversions, with the airflow acting parallel to the rotational axis of the rotor system.

The first method of conversion is proposed by machines built to perform radial airflow conversions where the airflow acts parallel to the rotor disc. These are conventionally designed machines where the rotor's rotation axis is mounted at substantially 90 degrees to the longitudinal axis of the fuselage. The proposal is to accelerate the aircraft to wing borne flight where the non-rotating wings support the aircraft allowing the rotor to be slowed then stopped and locked in place which then allows flight to continue as a fixed wing aircraft. The reverse procedure is then applied to convert back to rotary wing flight. The rotor is then powered up again for vertical landing. These aircraft propose to be able to operate in their conversion profile for extended periods of time.

These conventionally designed aircraft have evolved from earlier compound rotorcraft concepts which are capable of operating with slowed rotors, examples being the 1950's Fairy Rotodyne, the CarterCopter, and the DARPA Heli-Plane concepts. Recent attempts to produce a stopped rotor aircraft are the Sikorsky S-72 Rotor Systems Research Aircraft (RSRA) the X-Wing and the Boeing X50A Canard Rotor Wing (CRW).

The major problem encountered by all helicopters and designs attempting to stop or start a rotor system with a radial airflow is asymmetric lift. This is applicable to any rotor system operating with a relative airflow operating parallel to the rotor disc. As the rotor is slowed, the imbalance between each side starts to increase; eventually the airflow reverses over the full span of the retreating blade. The instability created by the once per revolution directional change in airflow creates significant instability that has prevented this concept from working successfully.

The second method of conversion is proposed by machines built to perform axial airflow conversions where with the airflow acts parallel to the rotational axis of the rotor system. These are unconventional designs known as Tail or Nose Sitters. These designs are built with the rotors rotation axis aligned with the fuselage longitudinal axis. As the name suggests, tail or nose sitters are required, due to their construction, to takeoff and land with their longitudinal axis pointing substantially vertically toward the sky or ground when in rotary wing modes of operation. Although it may be possible for this configuration to perform a conventional takeoff and landing in fixed wing mode, it cannot perform a rolling takeoff or landing in rotary wing modes of operation. These aircraft are able to operate in their conversion profile for extended periods of time.

There have been a number of rotorcraft design solutions proposed using this configuration, examples being the German Focke-Wulf Triebflügel from World War II and more recently the Thorpe SEEOP Spin Wing. The Thorpe SEEOP Spin Wing proof of concept prototype is the only Stop Rotor Aircraft that has successfully changed from rotary to fixed wing flight and back again. This aircraft proposed the use of large efficient rotors, but this limits the functionality of its fuselage space due to the rotor drive system being inside the fuselage.

The third method of conversion is performed by machines during a transient window of opportunity at very low or zero airspeed. These aircraft are conventionally designed machines, where the rotor's rotation axis is mounted at 90 degrees to the longitudinal axis of the fuselage. They can employ either bi-directional rotor blades or symmetrical airfoils with one blade being flipped during conversion. As yet there have not been any conventionally designed machines able to stop the rotor in forward flight and then restart it for vertical landing. The Herrick HV-2A Vertaplane of 1937 used a bi-directional rotor system that could be started in-flight from fixed-wing to autogiro mode, but not vice-versa. The US Naval Research Laboratory (NRL) Flip Rotor Concept is an example of an aircraft designed to use a conventional airfoil. The Bölkow/Stöckel P 109 Stopped Rotor concept of 1954-58 is another proposal that uses a transient conversion window.

The present invention seeks to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect, the present invention provides an aircraft comprising:
a fuselage having a longitudinal axis;
at least one helicopter main rotor operably mounted to the fuselage, the at least one helicopter main rotor comprising rotor blades rotatable about a rotation axis, wherein the rotor blades can be stopped in flight and adapted to provide symmetrical wing surfaces relative to the longitudinal axis; and
the aircraft having at least one control surface operable to provide a relative airflow in flight substantially aligned with the rotation axis of the at least one helicopter main rotor.

Preferably, the control surfaces can control the aircraft to travel with the relative airflow remaining substantially aligned with the rotation axis of the at least one helicopter main rotor.

Preferably, the rotation axis of the at least one helicopter main rotor is substantially perpendicular to the longitudinal axis of the fuselage.

Preferably, the aircraft comprises a centre of gravity, the at least one helicopter main rotor comprising a rotation axis substantially aligned with the centre of gravity.

Preferably, the aircraft further comprises supplemental means for providing forward thrust.

Preferably, the at least one helicopter main rotor can be adapted to provide symmetrical wing surfaces relative to the longitudinal axis prior to flight.

Preferably, the at least one helicopter main rotor can be adapted and rotated from a stopped position in flight to provide lift having a component substantially perpendicular to the longitudinal axis.

Preferably, the aircraft further comprises an anti-torque means operably mounted to the fuselage.

In one embodiment, the rotor blades can be configured into an asymmetrical configuration and a symmetrical configuration relative to the longitudinal axis.

Preferably, the aircraft further comprises means for transitioning at least one of the rotor blades for configuring the rotor blades between the asymmetrical and symmetrical configurations.

Preferably, the aircraft further comprises a rotor locking mechanism for locking the at least one helicopter main rotor to a stopped position.

Preferably, the at least one helicopter main rotor comprises at least two rotor blades which when stopped are aligned with the lateral axis of the fuselage.

In one embodiment, the at least two rotor blades are mounted to a rotor hub adapted to move the at least two rotor blades to an acute angle relative to the lateral axis of the aircraft.

In another embodiment, the at least two rotor blades are mounted to a rotor hub adapted to move the at least two rotor blades to a respective swept position relative to a longitudinal axis of the aircraft.

Preferably, the at least two rotor blades are mounted to respective hub sections of the rotor hub that allows the respective rotor blades to be moved independently of each other about the rotation axis.

Preferably, the aircraft further comprises at least one fixed wing mounted to the fuselage.

Preferably, the at least one fixed wing includes left and right side canard lifting surfaces.

Preferably, each canard lifting surface comprises a fixed front flying surface and a pivotable elevon control surface at a rear of the canard airfoil.

Preferably, the elevon control surfaces are driven by control means and comprise a range of travel of at least 40 degrees up and 90 degrees down.

Preferably, the aircraft further comprises at least one vertical tail attached to the rear of the fuselage, the at least one vertical tail having an aircraft rudder.

Preferably, the aircraft further comprises a horizontal stabilizer adjacent a top of the vertical tail.

Preferably, left and right sides of the horizontal stabilizer each comprise a fixed front flying surface and a pivotable control surface, each control surface having an inner portion extending within the lateral extremities of the fixed front flying surface and an extended portion disposed laterally beyond the lateral extremities of the fixed front flying surface.

Preferably, each extended portion of the stabilizer control surfaces has a greater chord depth than the chord depth of the adjacent inner portion.

Preferably, a majority of the control surface of each extended portion is disposed aft of the trailing edge of the adjacent inner portion.

Preferably, control surfaces of the horizontal stabilizer are driven by control means with a range of travel of at least 90 degrees up and 40 degrees down.

In another embodiment, the aircraft comprises a horizontal stabilizer at an aft portion of the fuselage.

Preferably, left and right sides of the horizontal stabilizer each comprise a fixed front flying surface and a pivotable control surface.

Preferably, each control surface comprises an inner portion extending within the lateral extremities of the fixed front flying surface, and an extended portion extending beyond the lateral extremities of the fixed front flying surface.

Preferably, the aircraft further comprises a respective vertical tail disposed at each of the lateral extremities of the fixed front flying surface, each vertical tail comprising an aircraft rudder.

Preferably, the inner portions are hinged about a hinge line extending along the rear of the fixed front flying surface.

Preferably, the extended portions extend fore and aft of the hinge line.

Preferably, each extended portion is pivotable about the hinge line with its adjacent inner portion.

Preferably, the control surfaces have a range of travel of 90 degrees up and 40 degrees down.

Preferably, the aircraft further comprises a respective elevon pivotably mounted to a trailing edge of each inner portion.

Preferably, the elevons have a range of travel of about ±30° relative to its respective inner portion.

In another aspect, the present invention provides a method of operating an aircraft capable of rotary wing flight mode and fixed wing flight mode and transitioning between said flight modes, the aircraft having a rotor rotatable about a rotation axis, the method comprising:

operating the aircraft in one of the rotary wing and fixed wing flight modes;

stabilizing the aircraft in a flight profile where the relative airflow is substantially aligned with the rotation axis of the rotor and controlling the aircraft to travel in this flight profile; and operating the aircraft in the other of the rotary wing and fixed wing flight modes.

Preferably, the rotary wing flight mode is one of autogiro, helicopter and compound helicopter flight modes.

Preferably, the aircraft further comprises at least one helicopter main rotor, the method further comprising using the relative airflow for starting or stopping the rotor.

In another aspect, the present invention provides an aircraft comprising:

a fuselage having a longitudinal axis; and at least one control surface operably mounted to the fuselage, the at least one control surface operable to provide a relative airflow in flight substantially perpendicular to the longitudinal axis, the at least one control surface controlling the aircraft to travel with the relative airflow remaining substantially perpendicular to the longitudinal axis.

Preferably, the aircraft further comprises at least one helicopter main rotor operably mounted to the fuselage, wherein the at least one helicopter main rotor can be stopped in flight and adapted to provide symmetrical wing surfaces aligned with the lateral axis of the fuselage.

In another aspect, the present invention provides an aircraft comprising:

a fuselage having a longitudinal axis;

at least one helicopter main rotor operably mounted to the fuselage, the at least one helicopter main rotor comprising rotor blades rotatable about a rotation axis;

wherein the rotor blades can be configured into an asymmetrical configuration and a symmetrical configuration relative to the longitudinal axis.

Preferably, the aircraft further comprises means for transitioning at least one of the rotor blades for configuring the rotor blades between the asymmetrical and symmetrical configurations.

Preferably, the transitioning means transitions the rotor blade(s) with a leading edge of the rotor blade(s) directed downward relative to the aircraft's vertical axis during the transition.

In another aspect, the present invention provides a wing for an aircraft, the wing comprising a fixed front flying surface and a pivotable control surface having an inner portion extending within the lateral extremities of the fixed front flying surface and an extended portion extending beyond the lateral extremities of the fixed front flying surface.

Preferably, the extended portion has a greater chord depth than the chord depth of the inner portion.

Preferably, a majority of the control surface of the extended portion is disposed aft of the trailing edge of the inner portion.

Preferably, the wing further comprises a respective elevon pivotably mounted to a trailing edge of each inner portion.

The present invention also provides an aircraft comprising:

a fuselage having a longitudinal axis;

at least one helicopter main rotor operably mounted to the fuselage, the at least one helicopter main rotor comprising rotor blades and rotatable about a rotation axis, wherein the rotor can be stopped in flight for the rotor blades to provide symmetrical wing surfaces relative to the longitudinal axis; and at least one control surface operably mounted to the fuselage, the at least one control surface operable in flight to provide the aircraft with a relative airflow substantially aligned with the rotation axis of the at least one helicopter main rotor Preferably, the aircraft further comprises a vectored thrust means for assisting the at least one control surface in providing the relative airflow in flight substantially aligned with the rotation axis of the at least one helicopter main rotor. The vectored thrust means preferably comprises one or more direction controllable thrust means, or diverted thrust lines of a forward thrust means and/or an anti-torque means. Other aspects of the invention are also disclosed.

BRIEF DESCRIPTION OF THE DRAWINGS

Notwithstanding any other forms which may fall within the scope of the present invention, preferred embodiments of the present invention will now be described, by way of examples only, with reference to the accompanying drawings in which.

DESCRIPTION OF EMBODIMENTS

Figure 1:
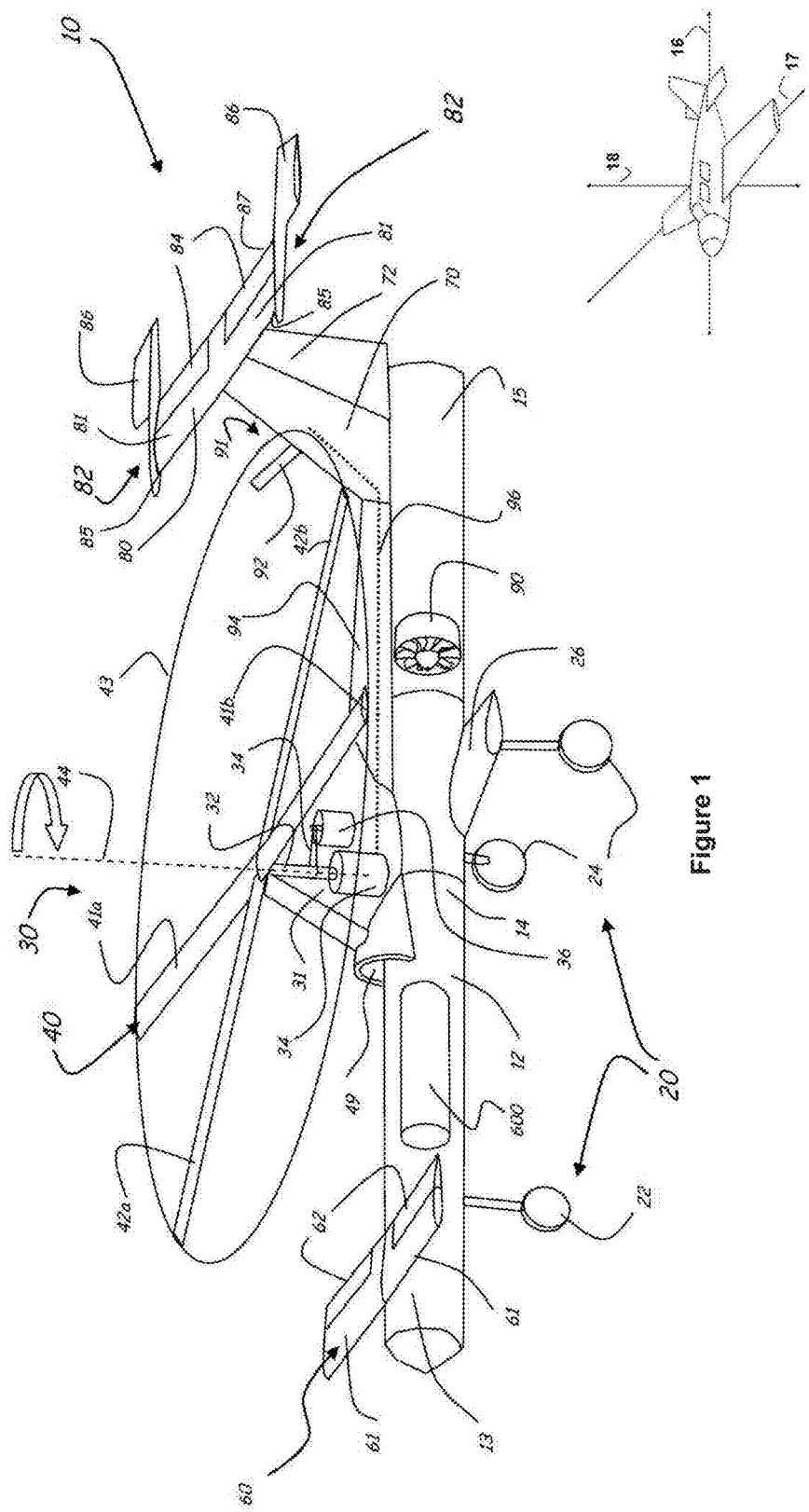
FIG. 1 is a schematic perspective view of an aircraft in accordance with a preferred embodiment of the present invention.
Figure 2:
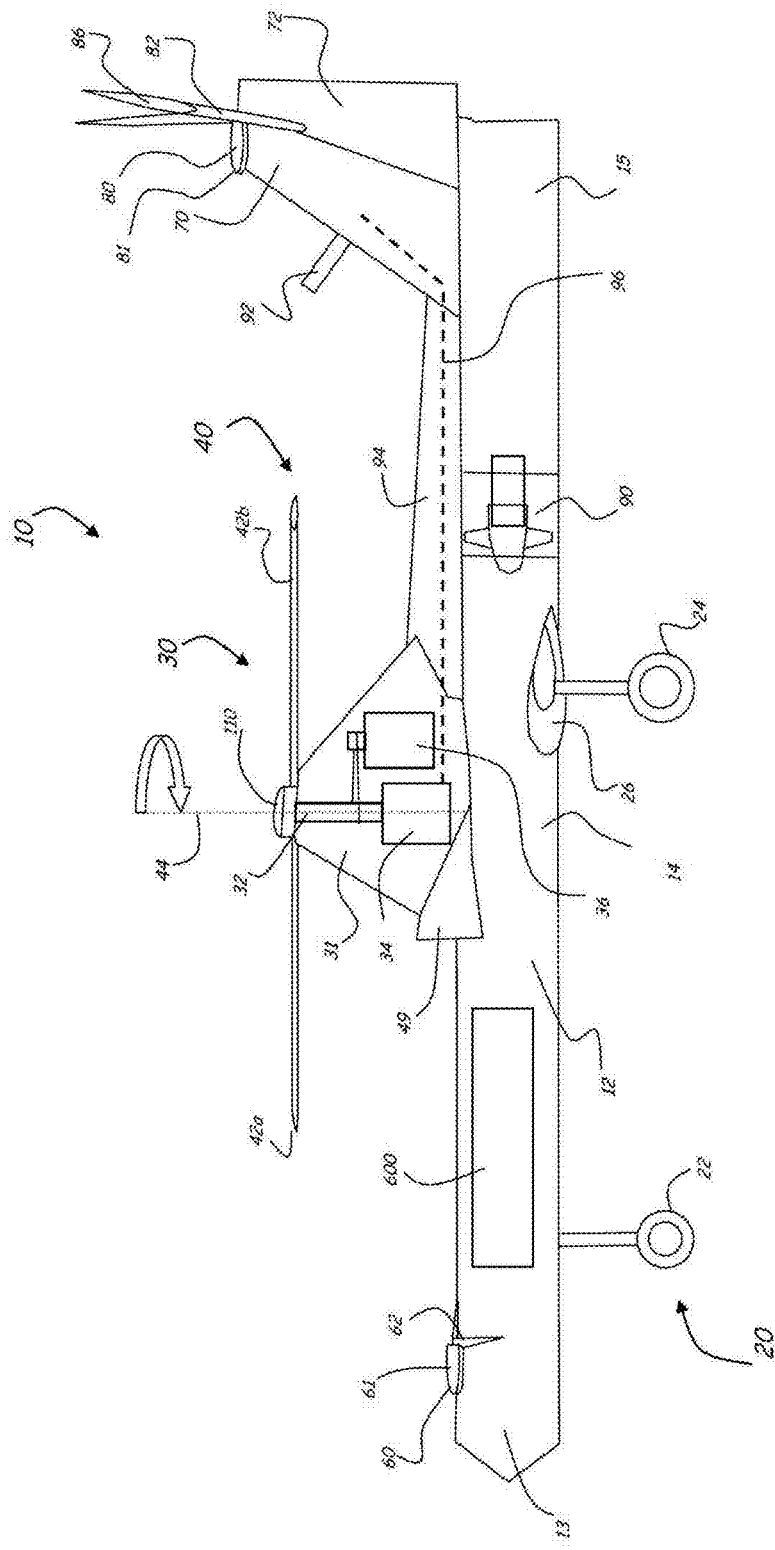
FIG. 2 is a side view of the aircraft of FIG. 1.
Figure 3:
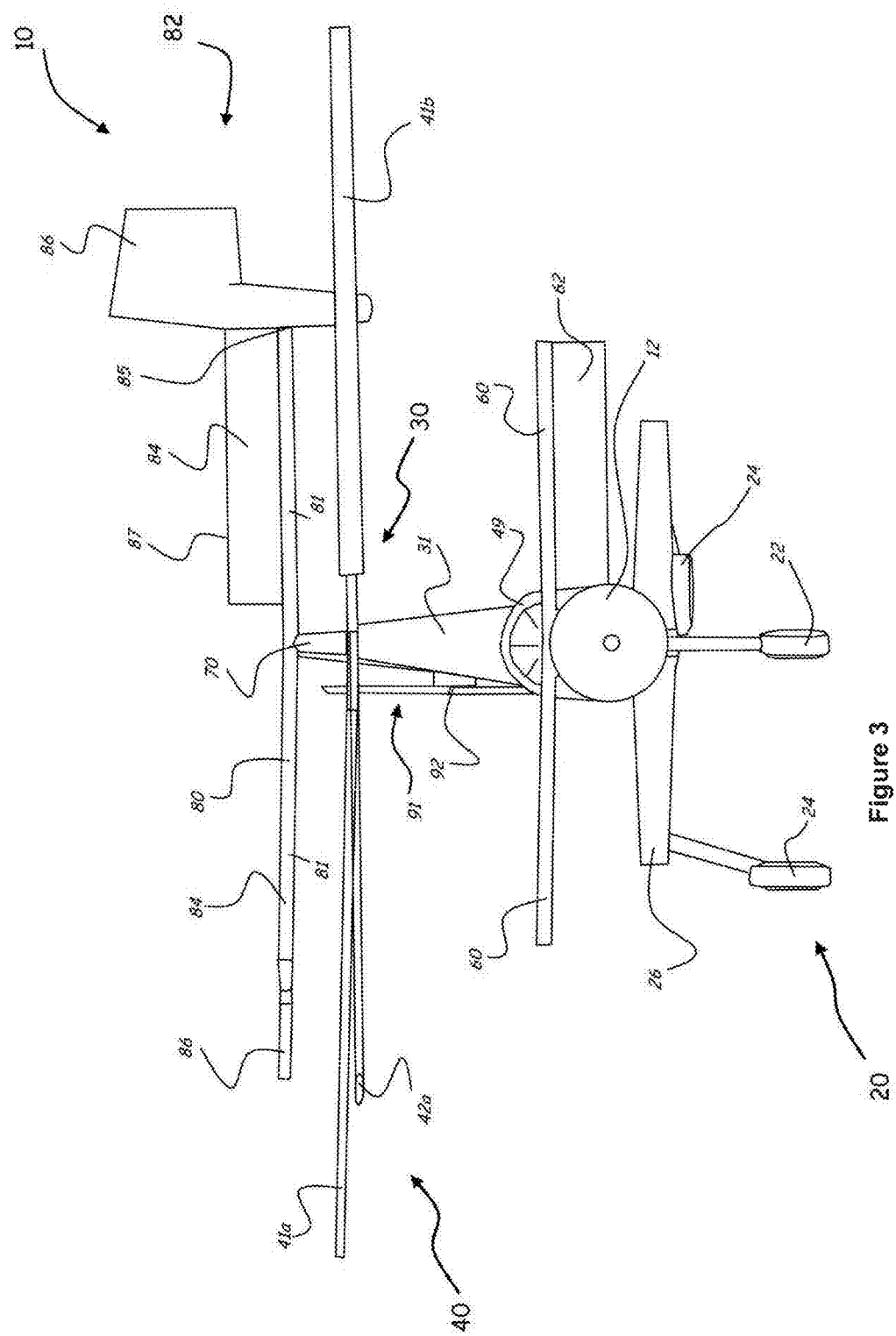
FIG. 3 is a front view of the aircraft of FIG. 1.
Figure 4:
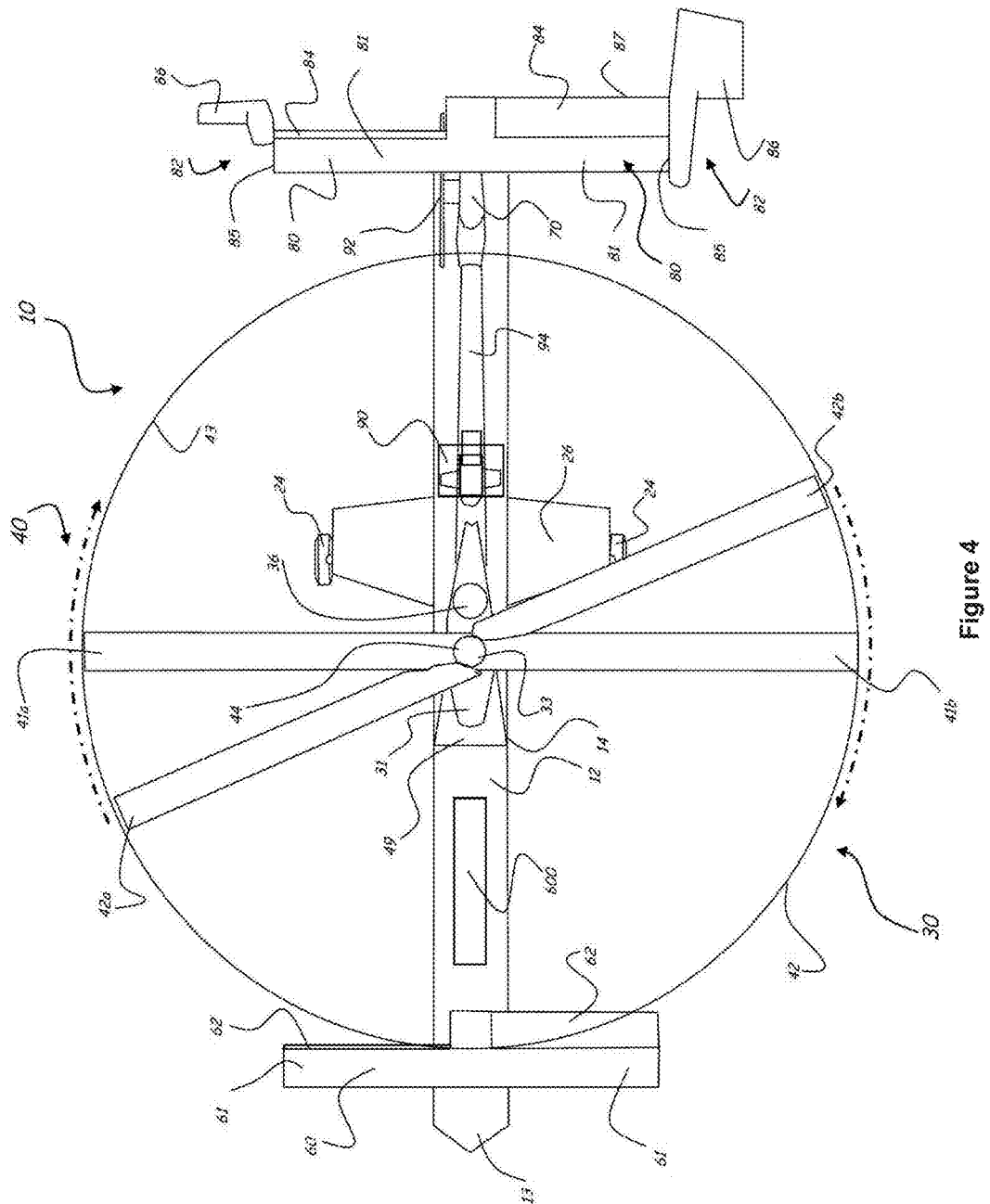
FIG. 4 is a top view of the aircraft of FIG. 1.

It should be noted in the following description that like or the same reference numerals in different embodiments denote the same or similar features.

Aircraft Components

FIGS. 1 to 4 show an aircraft 10 in accordance with a preferred embodiment of the present invention. The aircraft 10 comprises a generally elongated fuselage 12, landing gear 20, a canard lifting surface 60 at a fuselage fore portion 13, a helicopter main rotor assembly 30 at a fuselage mid-portion 14, a vertical tail 70 with a horizontal stabilizer 80 at a fuselage aft portion 15, and a supplemental forward thrust means 90 at the mid-portion 14. The fuselage 12 comprises a longitudinal axis 16, a lateral axis 17, and a vertical axis 18.

The fuselage 12 is supported by fixed or retractable tricycle landing gear 20, comprising front gear 22 supported at the fore portion 13 and a pair of rear landing gear 24 supported by a respective fixed stub wing 26 attached to the mid-portion 14.

The helicopter main rotor assembly 30 is mounted to the top and longitudinal centre of the fuselage 12 at the mid-portion 14. The main rotor assembly 30 comprises a housing 31 which houses a rotor mast 32 driven by engine 36, operating through a reduction gearbox 34. Attached to the top of the rotor mast 32 is a rotor hub 33 to which is attached a two-bladed rotor 40 comprising rotor blades 41a and 41b. The rotation axis 44 of the rotor mast 32 is located within an envelope which contains the center of gravity 101 (see FIG. 12) of the aircraft 10. The fuselage 12 comprises an intake 49 for directing air in use to the engine 36.

Figure 6:
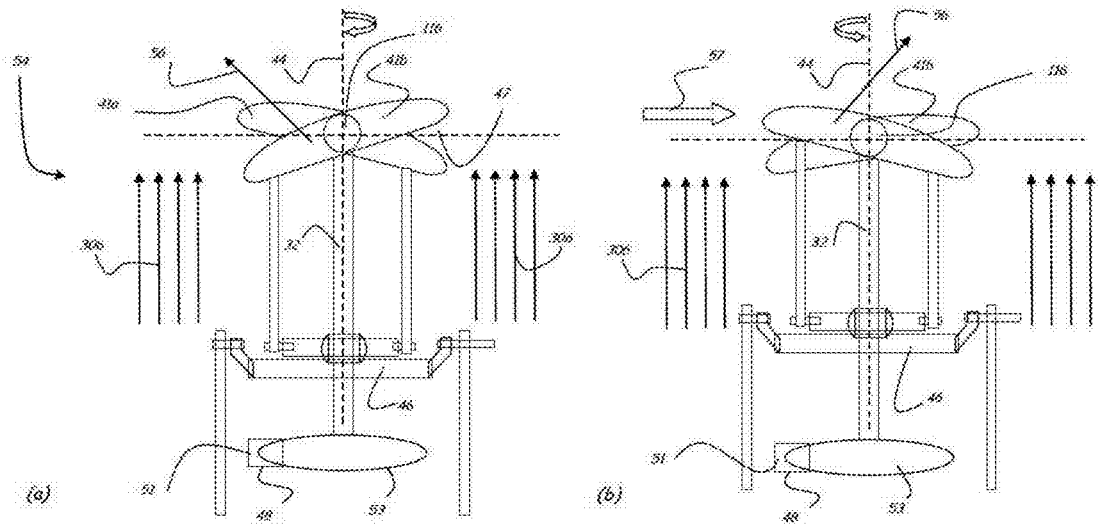
FIG. 6 is a schematic representation of the swashplate assembly for the aircraft of FIG. 1 when using the bi-directional airfoil rotor blades.

Referring to FIG. 6, the helicopter main rotor assembly 30 comprises a conventional helicopter swashplate control system 46 with the addition of a rotor locking mechanism 48 for locking the rotor 40 to a stopped position as further described below. The rotor locking mechanism 48 in the embodiment comprises a disc 53 connected to the rotor mast 32, and a rotor brake and lock means 51. The rotor locking mechanism 48 includes means for locking the rotor blades 41 in the desired alignment relative to the fuselage 12.

Figure 5:
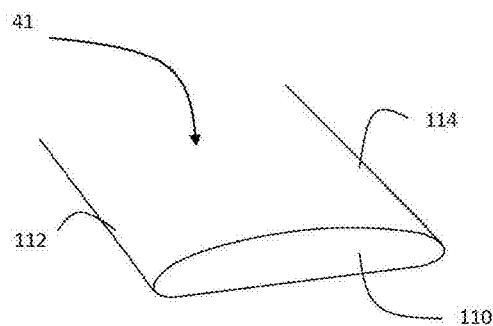
FIG. 5 is a schematic perspective end view of a bi-directional airfoil rotor blade for the aircraft of FIG. 1.

Two configurations of the rotor blades are possible for the aircraft 10. The first configuration uses a bi-directional airfoil 110 as shown in FIGS. 5 and 6, and referred to as the rotor blades 41. The airfoil 110 comprises identical leading and trailing edges 112, 114 and allows the airfoil 110 to operate in both forward and backward directions. The feathering axis 116 of the rotor blades 41 having the airfoil 110 is disposed halfway between the leading edge 112 and the trailing edge 114.

The second alternative configuration uses symmetrical airfoil sections commonly used in helicopters and referred to as rotor blades 42a, 42b in FIGS. 1 to 4. It is to be understood that the rotor 40 in the preferred embodiment comprises two rotor blades only, that is, either the rotor blades 41 or the rotor blades 42. The aircraft 10 is initially described referring to the first configuration. The second configuration is described further below with reference to FIG. 22.

Referring back to FIGS. 1 to 4, when the rotor 40 is operated as a rotary wing, tips of the rotor blades 41a and 41b define a swept path 43. The canard lifting surface 60 is mounted at the fore portion 13, disposed substantially forward of the swept path 43. Both left and right sides of the canard airfoil comprises a fixed front flying surface 61 and a large span elevon (elevator and aileron) control surface 62 pivotably attached at the rear of the canard airfoil 60. The elevon control surfaces 62 are driven by electromechanical servos and have a range of travel of 40 degrees up and 90 degrees down.

Attached to the top of the aft portion 15 of the fuselage 12, outside the rotor tip swept path 43, is the vertical tail 70 having a conventional aircraft rudder 72. Attached to the top of the vertical tail 70 is the horizontal stabilizer 80 of substantially equal proportions to the canard lifting surface 60. Both left and right sides of the horizontal stabilizer 80 comprise a fixed front flying surface 81 and pivotable large span elevon control surfaces 82.

The control surfaces 82 comprise an inner portion 84 extending within the lateral extremities 85 of the fixed front flying surface 81, and an extended portion 86 disposed laterally beyond the lateral extremities 85 of the fixed front flying surface 81. Each extended portion 86 has a greater chord depth than the chord depth of the inner portion 84. Also, a majority of the control surface of each extended portion 86 is disposed aft of a trailing edge 87 of the adjacent inner portion 84. The control surfaces 82 are driven by electromechanical control means with a range of travel of 90 degrees up and 40 degrees down.

The aircraft 10 further comprises an anti-torque means 91 comprising a tail rotor 92 provided on the tail 70, which is used when the main rotor 40 is operated as a rotary wing. The generally cylindrical body of the fuselage 12 is modified by addition of a dorsal faring 94 which provides coverage for an anti-torque drive shaft 96 for the tail rotor 92, which is mechanically linked to the engine 36. The dorsal fairing 94 also assists in stabilising the aircraft 10 during transition with a vertically aligned airflow as further described below.

Aircraft Transition Between Flight Modes

One of the features of the aircraft 10 is it allows transition, during flight, between at least two flight modes, two of which are a helicopter flight mode and an airplane flight mode. In helicopter flight mode, the rotor 40 is used as a rotary wing in a similar manner as conventional helicopters via the swashplate control system 46. The anti-torque means 91 is also operated in this flight mode. In airplane flight mode, the rotor 40 is aerodynamically stopped and then locked via the rotor locking mechanism 48, and the rotor blades 41 are adapted to provide symmetrical wing surfaces relative to the longitudinal axis 16. Since the feathering axis 116 of the rotor blades 41 is disposed halfway between the leading edge 112 and the trailing edge 114, stopping the blades 41 to be aligned with the lateral axis 17 is the only operation required to provide the symmetrical wing surfaces relative to the longitudinal axis 16. The supplemental forward thrust means 90 is actuated to provide forward thrust in this mode and the aircraft 10 is flown as an airplane.

During transition of the aircraft 10 between the helicopter and aircraft flight modes in flight, which involves aerodynamically stopping the rotor 40 (FIG. 6b) into the symmetrical stopped position or starting rotation of the rotor 40 (FIG. 6a), the aircraft 10 is flown through a transition flight mode. In this transition flight mode, the control surfaces 62 and 82 of the aircraft 10 are actuated to orient the aircraft to provide a relative airflow in flight substantially aligned with the rotation axis 44 of the main rotor 40, thus providing a controlled flight profile of the aircraft 10 where the rotor is subjected to a symmetrical airflow allowing stable stopping or starting of the rotor. The aircraft 10 is capable of sustained flight in this transition flight mode, subject to altitude and/or entry velocity. The aircraft is sustained in this stabilized flight profile and controlled to travel in this flight profile.

Example Flight Profile—Fixed Wing Take Off to Rotary Wing Landing

Figure 7:
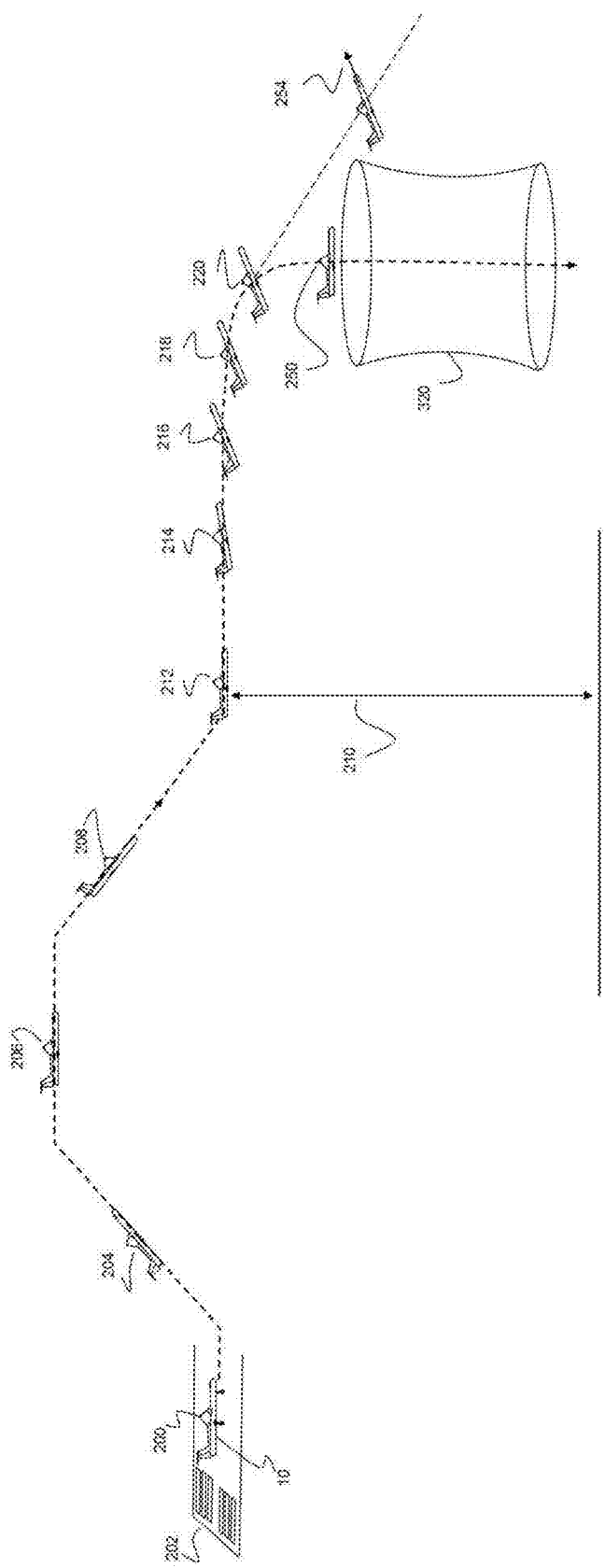
FIG. 7 is a schematic representation of an example flight profile of the aircraft of FIG. 1, from fixed wing flight mode to rotary flight mode.
Figure 8:
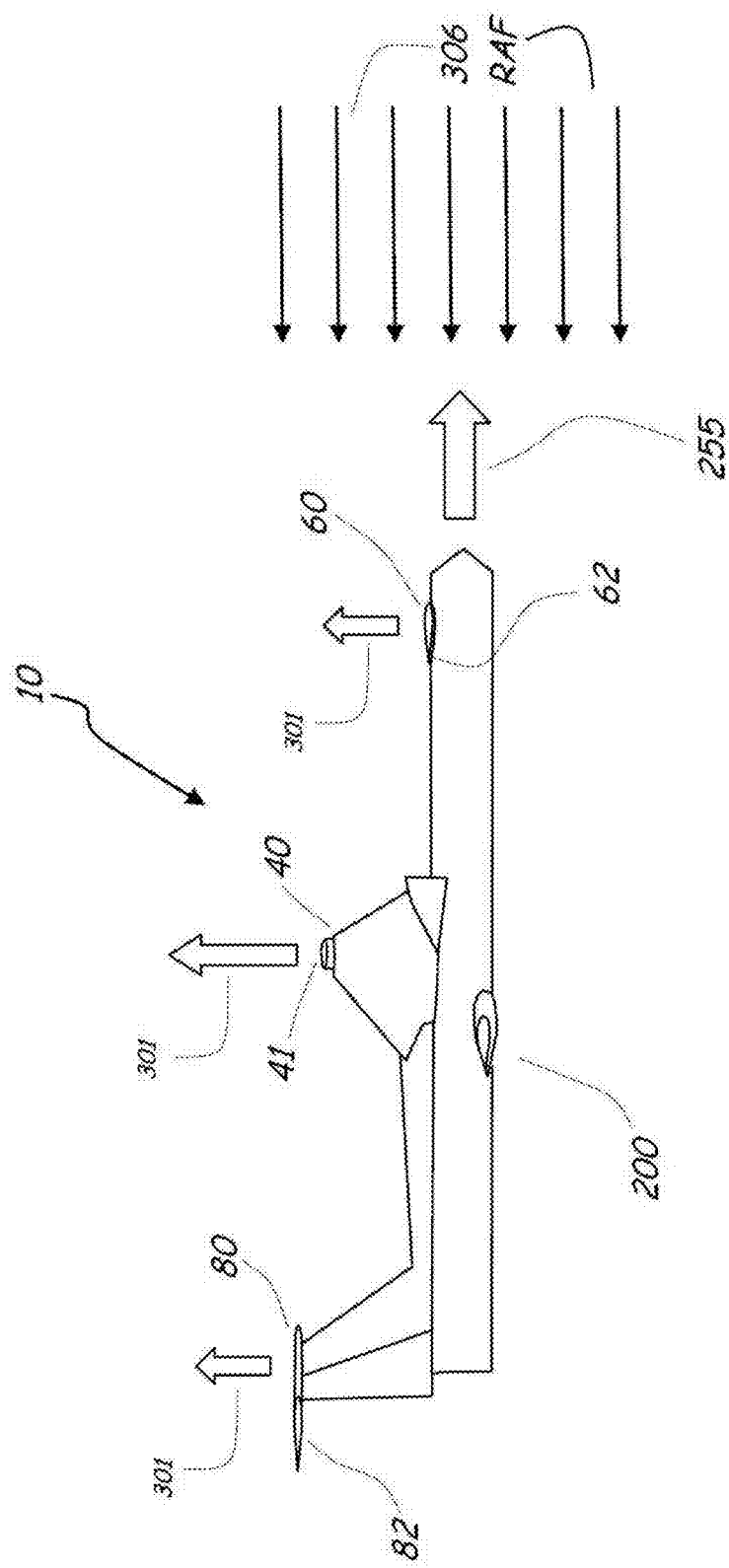
FIG. 8 is a schematic representation of the aircraft of FIG. 1 and the relative airflow during fixed wing flight mode.

Referring to FIGS. 7 and 8, the aircraft 10 starts in fixed wing mode 200 with the main rotor 40 in the locked position, and the rotor blades 41 aligned with the lateral axis 17 of the aircraft 10. The control surfaces 62 and 82 are in the fixed wing mode (i.e. substantially aligned with their respective fixed flying surfaces 61 and 81). Control inputs to the control surfaces 62 and 82 act in the conventional sense, and roll commands are sent to the rotor blades 41 via collective pitch changes which result in a change in incidence of each rotor blade 41. As the main rotor 40 is locked in alignment with the lateral axis 17 of the aircraft 10, the collective inputs now create incidence changes in the rotor blades 41 and which now act as full span, variable incidence ailerons resulting in a roll response to the aircraft 10 when in forward flight.

Takeoff as a fixed wing aircraft is performed by the application of thrust from the supplemental forward thrust means 90 which results in an increase in forward motion, and therefore airspeed, along a surface, normally a runway 202. Once sufficient speed is obtained to produce the lift required to attain flight, the aircraft 10 rotates by deflections of the control surfaces 62 and 82 on the canard 60 and stabilizer 80. After take off the aircraft 10 climbs 204 to a cruising height and transits 206 to its destination with the speed and efficiency of a fixed wing aircraft. The rear stabilizer control surfaces 82 work in harmony with the canard control surfaces 62 to control pitch and roll of the aircraft in all but hovering flight.

Close to the destination a descent 208 is performed to an altitude 210 which provides sufficient height above terrain to perform the transition manoeuvre via the transition flight mode. Entry to the transition flight mode is typically made at a level altitude, in a wings level attitude 212. A reduction in power of the thrust means 90 results in a reduction in forward velocity 214 and as the angle of attack of the aircraft 10 is increased to maintain lift and hold the altitude 216, there is a further increase in drag which continually decelerates the aircraft 10.

Figure 9:
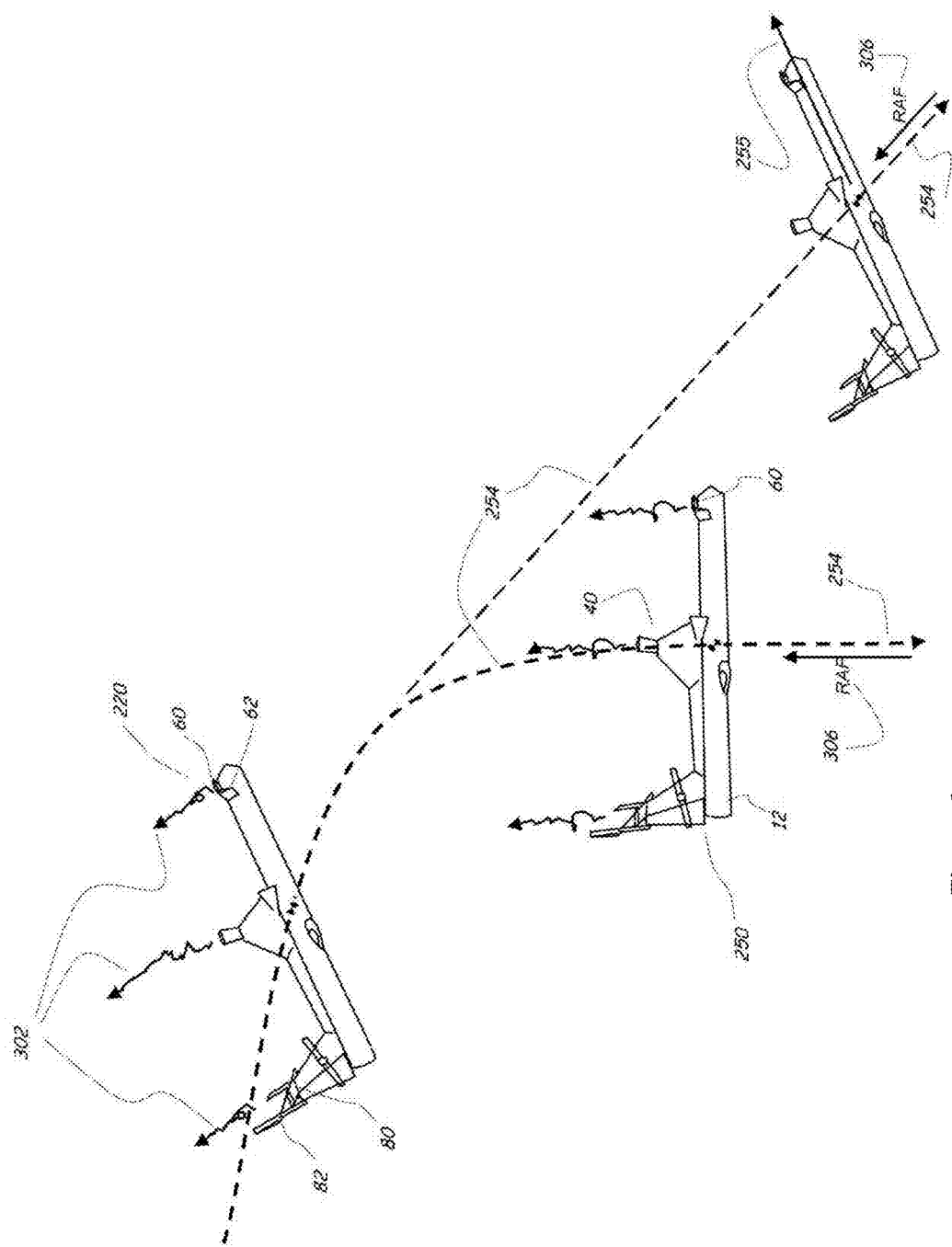
FIG. 9 is a schematic representation of the aircraft of FIG. 1 during entry into the transition flight mode.
Figure 10:
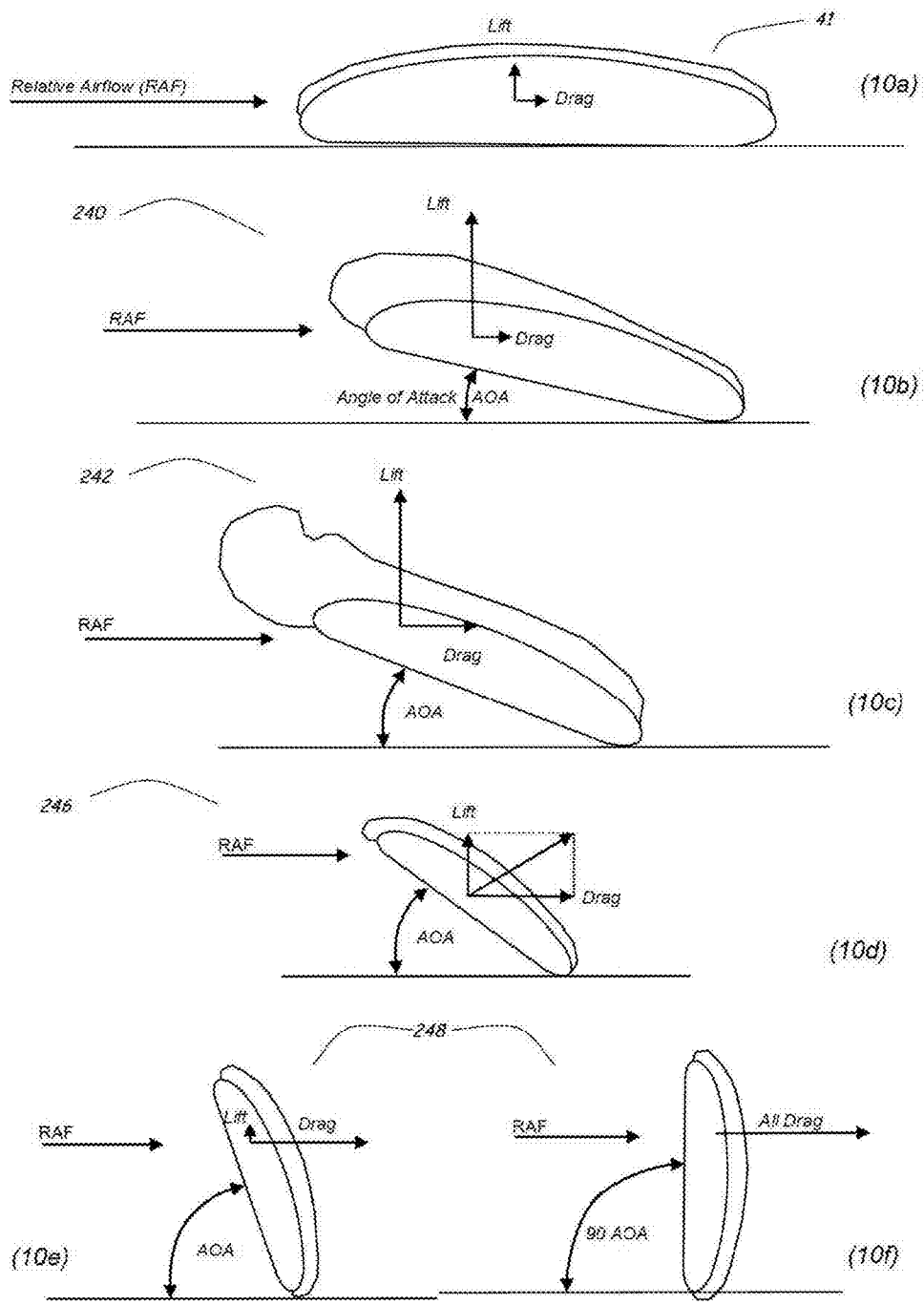
FIG. 10 are schematic representations of the relative airflow and resulting forces acting on a cambered airfoil rotor of FIG. 5.

Referring to FIGS. 7, 9 and 10, at the critical angle of attack 218, progressive nose up pitch control is smoothly applied until full travel of the elevon control surfaces 62 and 82 is reached, which results in progressive stalling 220 (see FIG. 9) of the rotor blades 41, canard 60 and stabilizer 80. Application of thrust 255 via the thrust means 90 can be used to modify the flight profile 254. The aircraft 10 maintains control throughout this manoeuvre due to the specific design layout. The control surfaces 62 and 82 ensure aerodynamic control is maintained during the transition flight mode.

Referring to FIG. 10, as the angle of attack increases beyond the critical angle of attack 240 (the stall angle of attack (AOA) is approx. 16 degrees) pressure gradients and associated turbulence creates instability 242. Beyond 40 degrees AOA and up to the aircraft 10 design limit of 90 degree angle of attack, where the airflow is aligned with the rotation axis 44, turbulent flow stabilizes 246 and drag becomes the predominant force acting on the airfoil 248. The application of full control travel moves the aircraft 10 through this region of instability into the relatively stable post stalled range of angles of attack shown in 10f as in transition flight mode.

Figure 12:
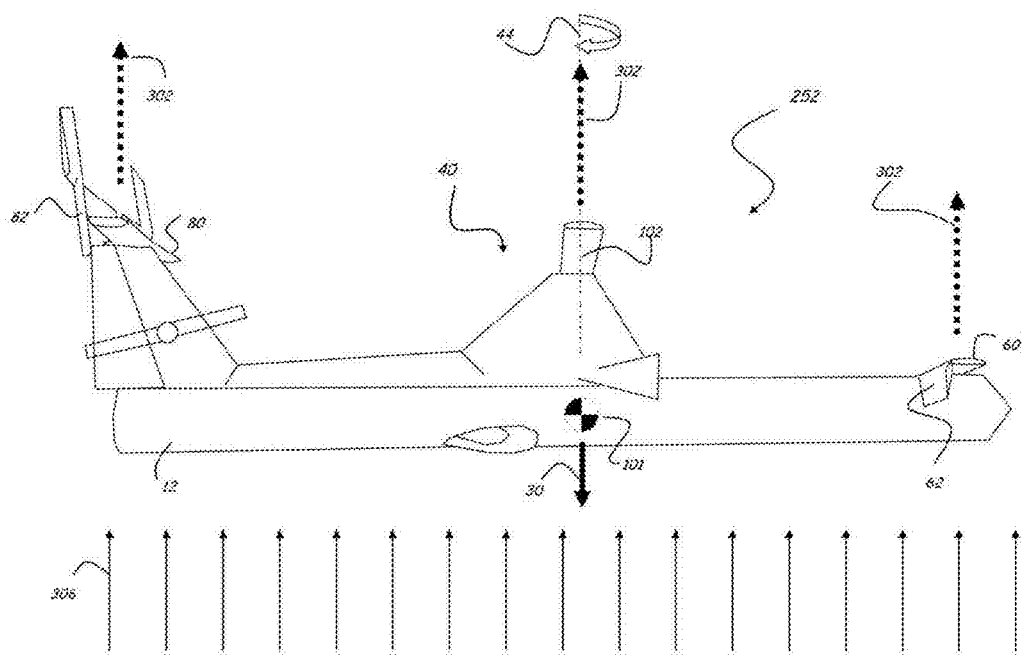
FIG. 12 is a schematic representation of the relative airflow across the aircraft of FIG. 1 during controlled flight in the transition flight mode.

Referring to FIGS. 7, 9 and 12, the resultants of the forces generated by the various aircraft components, the fuselage 12, the main rotor 40, the canard 60 and the stabilizer 80 and their respective control surfaces 62 and 82 in the transition flight mode, produce moments that result in a stable flight profile 250. Referring to FIG. 12, this stabilises the aircraft 10 in a vertical descent 252, with power off, in this transition flight mode.

Figure 11:
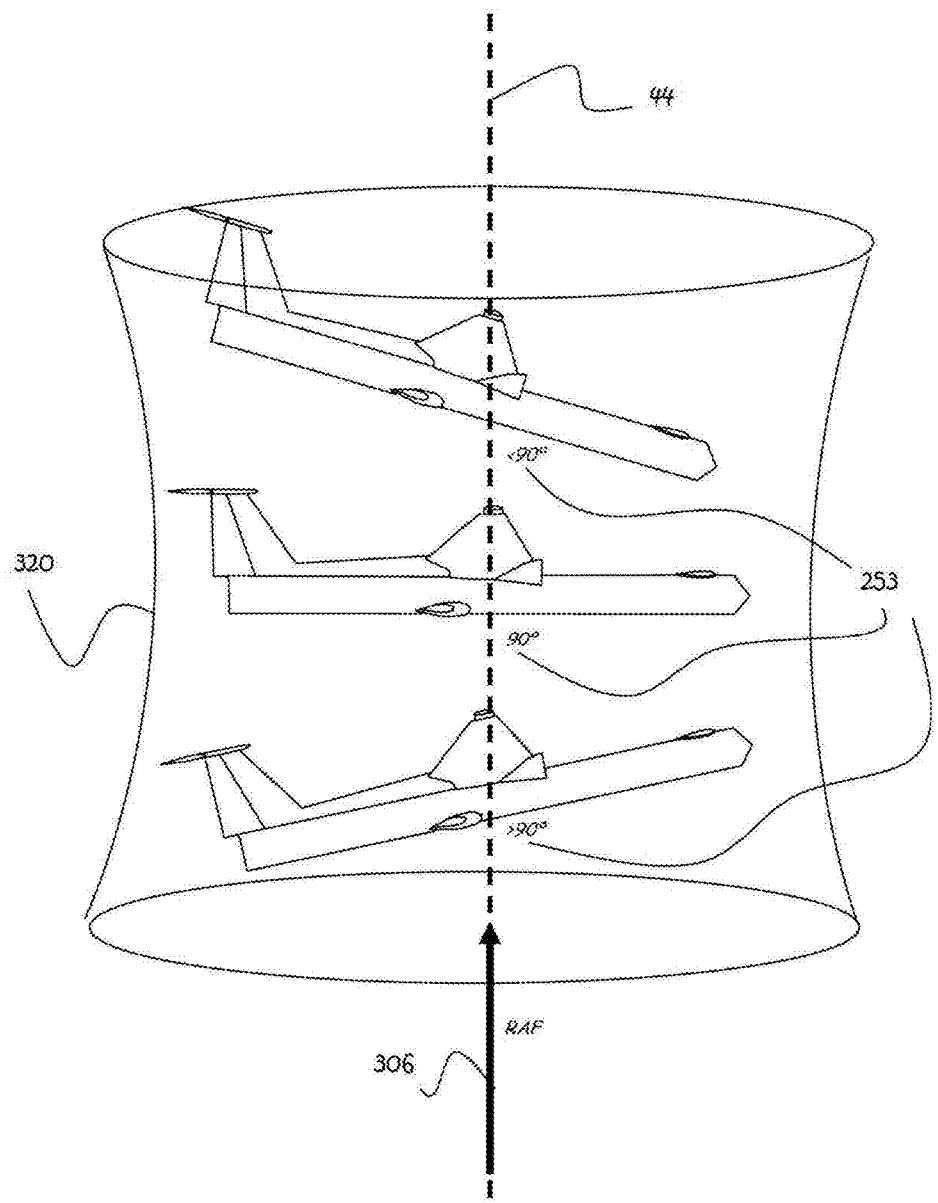
FIG. 11 is a schematic representation of the aircraft of FIG. 1 in the transition flight envelope, this being the range of acceptable relative airflows which are substantially aligned with the rotation axis of the main rotor.

FIG. 11 shows the aircraft 10 stabilized in a transition envelope 320, which is defined by the range of relative angles 253 between the airflow 306 and the rotation axis 44 of the main rotor 40 that permit conversion from fixed to rotary wing flight or the reverse to take place. In this envelope 320, the relative airflow 306 is substantially aligned with the rotation axis 44. The control surfaces 62 and 82 thus allow the aircraft 10 to travel with the relative airflow 306 remaining substantially aligned with the rotation axis 44 of the main rotor 40.

FIG. 12 shows the forces acting on the aircraft 10 during the transition profile 252, which includes drag 302, the aircraft weight 304 and the relative airflow 306. The aerodynamic moments created by the control surfaces 62 and 82 of the canard 60 and horizontal stabilizer 80 are controlled to balance the drag forces 302 that allow stable operation with a relative airflow 306 substantially aligned with the rotation axis 44 of the main rotor 40. This results in a substantially symmetrical airflow acting on the rotor blades 41a and 41b allowing stable aerodynamic stopping or starting of the rotor 40.

Figure 13:
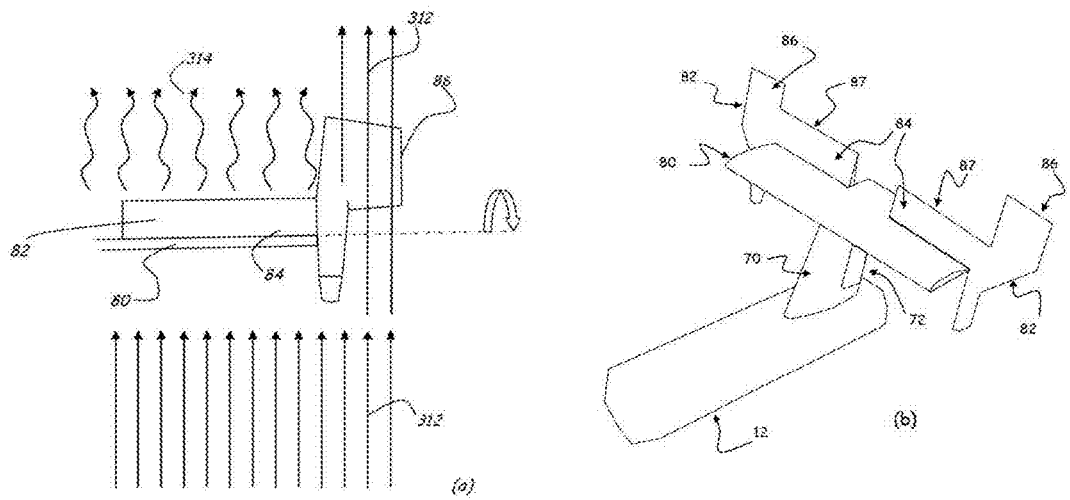
FIG. 13 is a schematic representation of the relative airflow across the control surface of the horizontal stabilizer of the aircraft of FIG. 1 during controlled flight, where (a) is a front view and (b) is a perspective view, and (c) is a perspective view of a horizontal stabilizer according to another embodiment.

Referring to FIG. 13, the extended portion 86 of the control surfaces 82 are designed to operate in the laminar airflow 312 clear of turbulent airflow 314 created by the horizontal stabilizer 80 in the transition flight mode. The control surface area and range of motion of the control surfaces 82 are designed to provide sufficient control authority and stability to control the aircraft 10 throughout all phases of flight, including entry, operations in, and exit from the transition envelope.

Figure 13C:
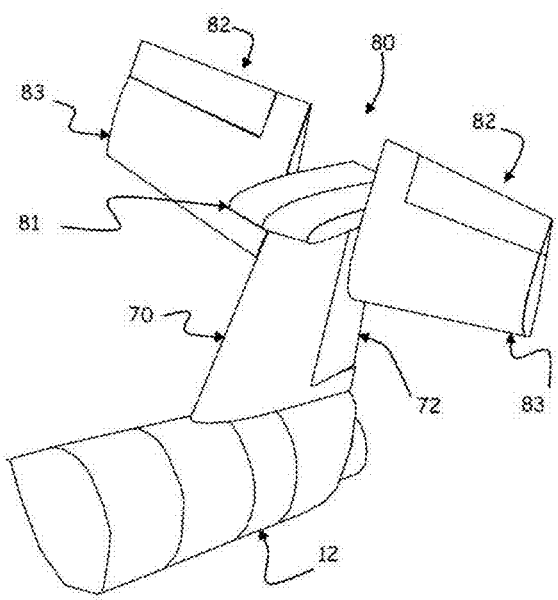

The relationship between the aircraft's centre of gravity (CG) 101 and centre of pressure (CP) 102 results in a stable flight profile. With sufficient entry velocity into the transition profile, this profile can be at any attitude, but will stabilise in a wings level attitude toward the earth with no additional thrust from supplemental thrust means 90. FIG. 13(c) shows a horizontal stabilizer 80 according to another embodiment. In this embodiment, the horizontal stabilizer 80 comprises a fixed central portion 81 and pivotable lateral portions 83 each having a pivotable elevon 82. In normal flight mode, the lateral portions 83 remain aligned with the fixed central portion 81 with the elevons 82 functioning as normal. In controlled flight transition mode, the lateral portions 83 with the elevons 82 are operated to enable the transition mode.

Figure 14:
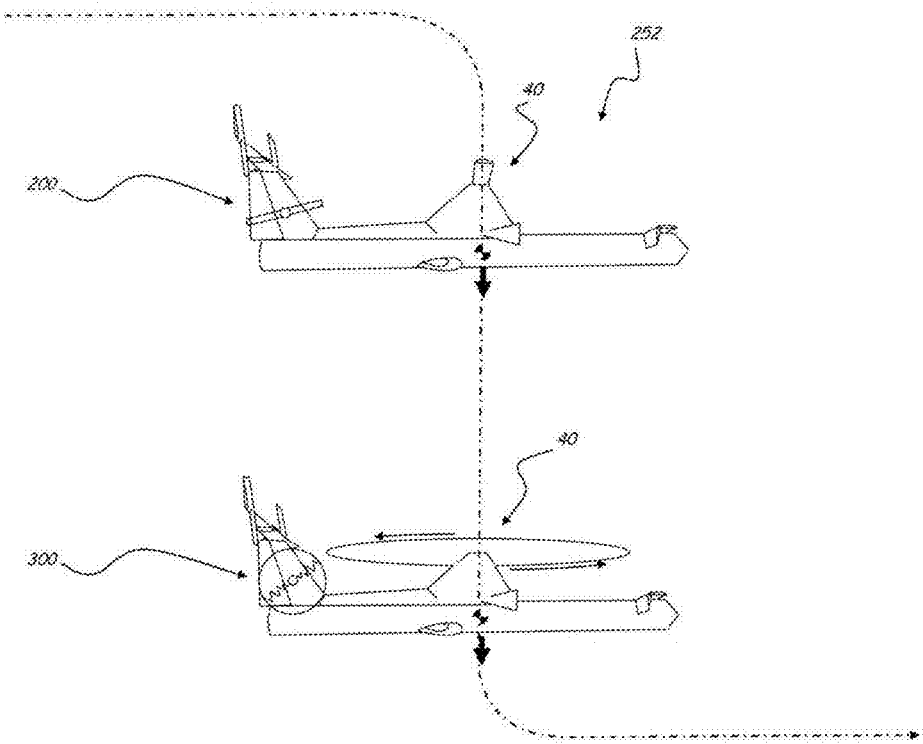
FIG. 14 is a schematic representation of the aircraft of FIG. 1 in transition from fixed wing flight mode to rotary wing flight mode.
Figure 15:
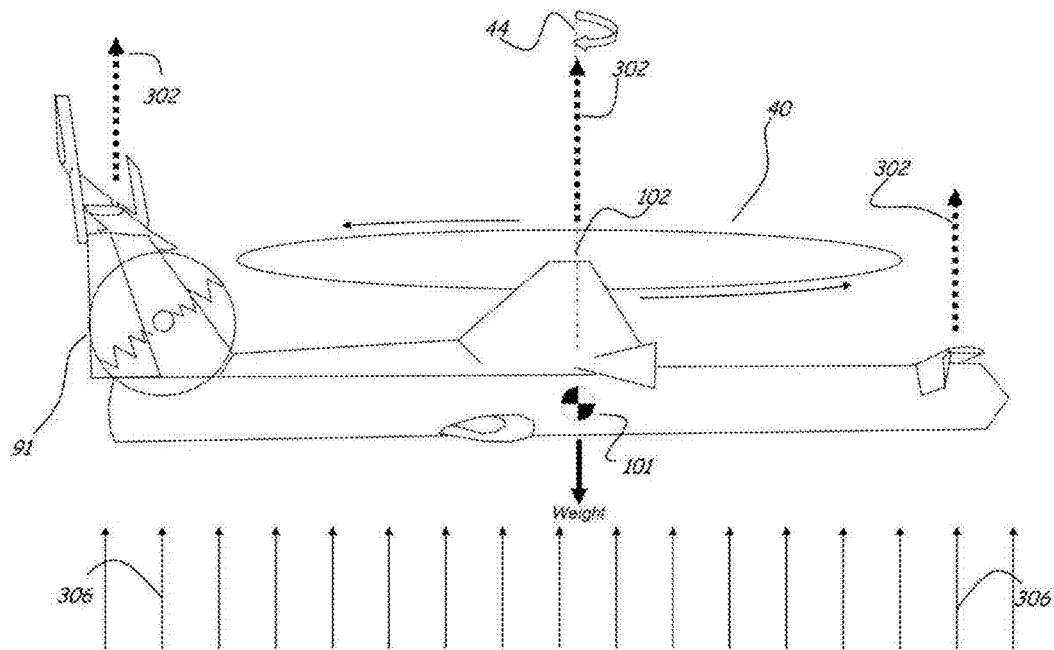
FIG. 15 is a schematic representation of the relative airflow across the aircraft of FIG. 1 during initial stages of the transition to rotary flight mode.
Figure 16:
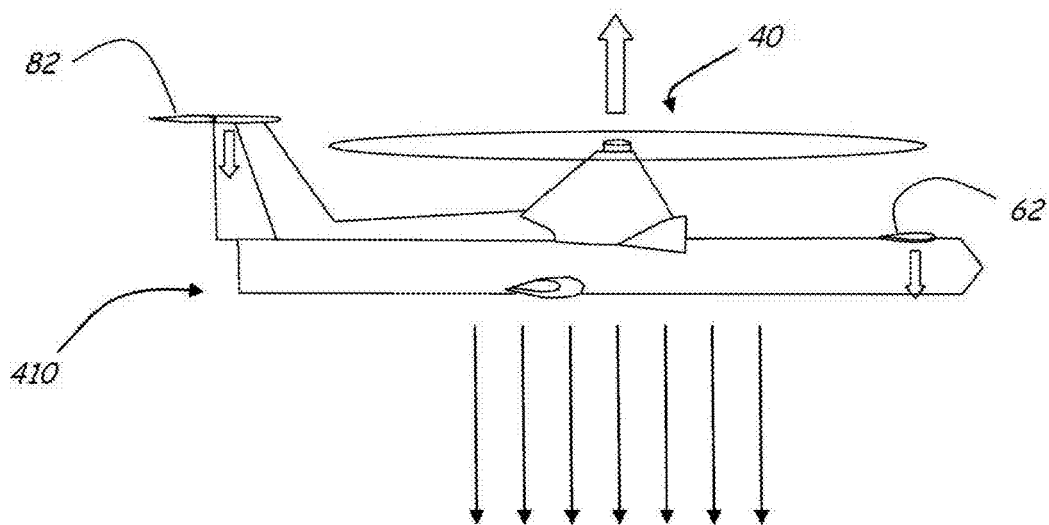
FIG. 16 is a schematic representation of the aircraft of FIG. 1 and the relative airflow during rotary wing flight mode.

Referring to FIGS. 14 to 16, flight control computers then configure the aircraft 10 for rotary wing transition 300 and the main rotor 40 is unlocked by the rotor locking mechanism 48. Referring back to FIG. 6a, a predetermined collective pitch setting 47 is then applied to the main rotor 40 via the swashplate control system 46. This causes the resultant aerodynamic forces 56 acting on the main rotor 40 to accelerate it around the rotation axis 44. As main rotor RPM increases collective pitch 47 is used to control the RPM within design limits. As cyclic control inputs become effective, the flight mode is set to rotary wing flight and the aircraft is flown away in any of the three rotary wing modes. Thus, the relative airflow 306 is used for starting the main rotor 40.

Referring to FIGS. 15 and 16, once main rotor 40 RPM has stabilised and cyclic control inputs become effective, the aircraft is in an auto-rotative descent 54 (see FIG. 6a), the flight mode is set to rotary wing flight, then power can be applied to the main rotor 40 and the anti-torque means 91 to fly the aircraft 10 as a conventional helicopter 410.

As in any normal helicopter, full main rotor 40 control is achieved via the swashplate control system 46 which allows cyclic pitch inputs for pitch and roll, and collective pitch via the collective pitch lever. The control surfaces 62 and 82 respond in the correct sense to the flight control commands to work with the helicopter rotor 40 to achieve the commanded flight profile. The aircraft 10 can then perform any rotary wing mission profiles, including vertical takeoff and landing on unprepared sites as a conventional helicopter.

Example Flight Profile—Rotary Wing Take Off to Fixed Wing Landing

Figure 17:
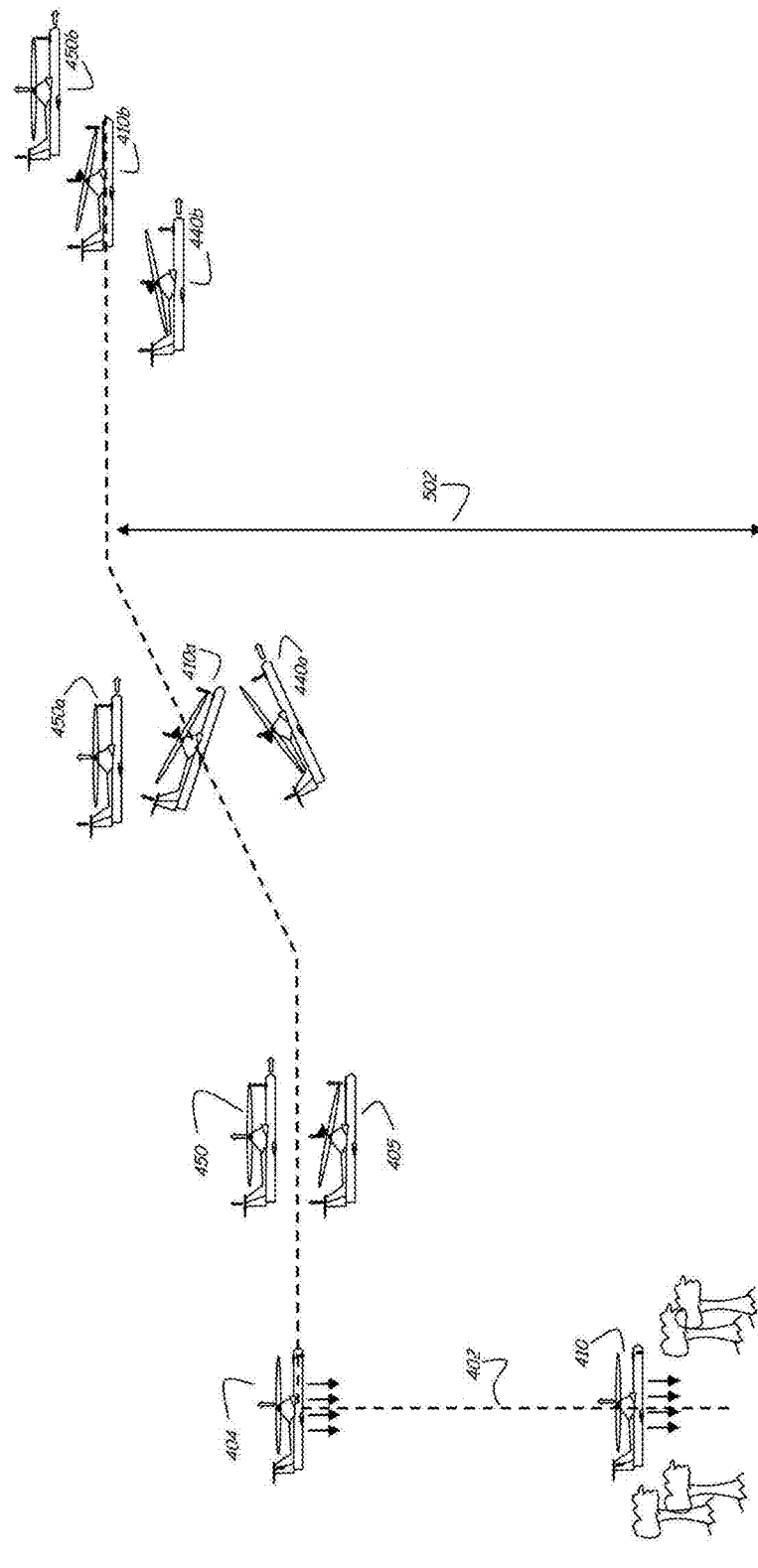
FIG. 17 is a schematic representation of another example flight profile of the aircraft of FIG. 1, performing a vertical take-off then accelerating and departing in one of three rotary wing flight modes.
Figure 20:
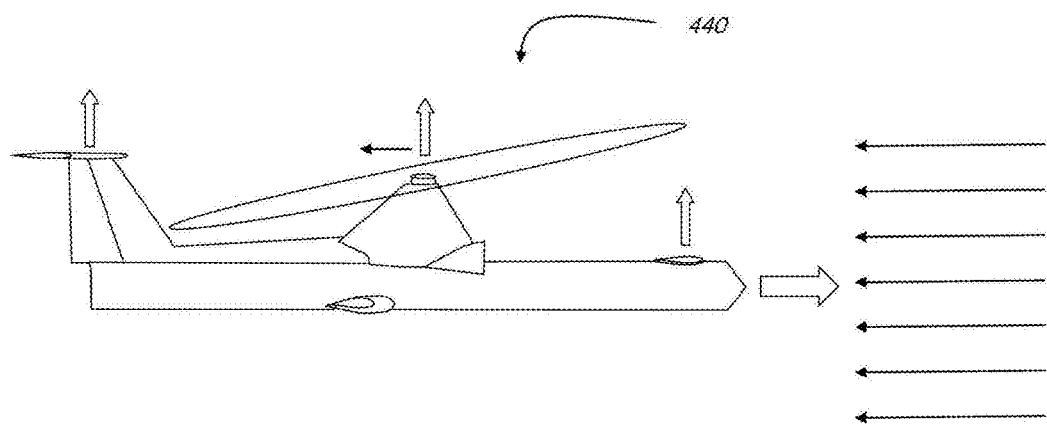
FIG. 20 is a schematic representation of the aircraft of FIG. 1 and the relative airflow during autogiro flight mode.
Figure 21:
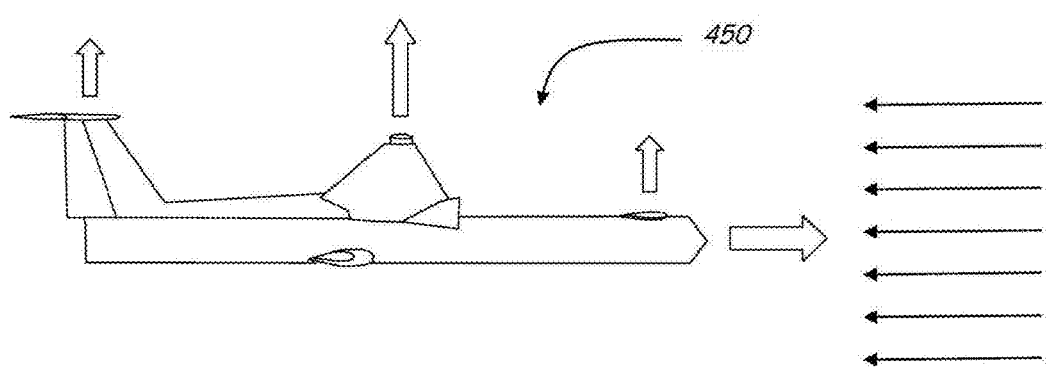
FIG. 21 is a schematic representation of the aircraft of FIG. 1 and the relative airflow during compound helicopter flight mode FIG. 22 are schematic representations of an alternative main rotor configuration using symmetrical airfoil rotor blades, showing transition of the rotor blades from fixed to rotary wing flight mode.

Referring to FIG. 17, vertical takeoff capability 402 is available in the helicopter flight mode 410. Alternatively, the aircraft 10 can be operated in autogiro mode 440 (see FIG. 20) and take off is achieved using a rolling start. The aircraft 10 has conventional collective, cyclic and anti-torque control responses, resulting in full three dimensional hover capabilities. Flight can be initiated in the desired direction from the hover 404 by cyclically tilting 405 the rotor disc via the swashplate control system 46 to provide forward thrust and movement in any direction as in a conventional helicopter. Alternatively, forward flight can be initiated using the supplemental forward thrust means 90 such that the aircraft 10 acts as a compound helicopter 450 (see FIG. 21). This offloads the main rotor 40 from its requirement to produce forward thrust.

As the aircraft 10 comprises fixed flying surfaces, including the canard 60 and the horizontal stabilizer 80, the aircraft 10 technically provides lift compounding. That is, lift assistance is provided by these lifting surfaces 60 and 80 as soon as those surfaces start to gain airspeed.

Climb 410a and cruise performance 410b in helicopter flight mode 410, where the main rotor 40 is providing all the forward thrust, is at a reduced efficiency compared to a pure helicopter by the drag effects on the canard 60 and horizontal stabilizer 80. The same lifting surfaces 60 and 80 assist the aircraft 10 in autogiro flight 440 (climb 440a and cruise 440b) and compound helicopter mode 450 (climb 450a and cruise 450b). These lifting surfaces 60 and 80 thus allow higher speeds due to the extra thrust available due to the ability to offload the main rotor 40 from the requirement to produce forward thrust and lift. Short to medium range flights can be flown in any of these rotary wing modes, from which a rolling or vertical landing can be made.

For long range flights conversion to fixed wing mode 200 (FIG. 8) is preferable, this being more efficient aerodynamically and operationally. There are many advantages gained by operating as a fixed wing aircraft. Conversion to fixed wing flight mode, can be made from any rotary wing mode, and is achieved in the following manner.

Figure 18:
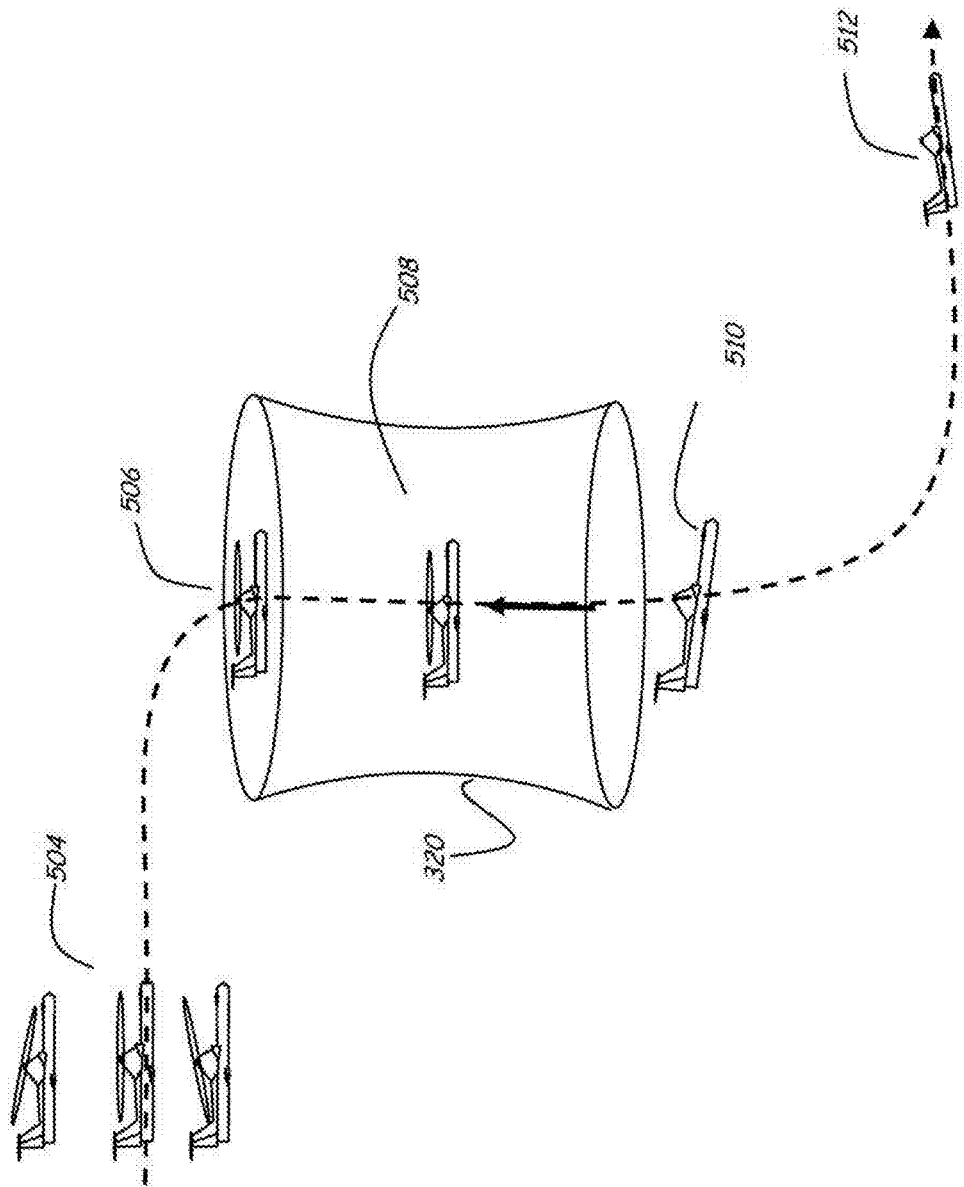
FIG. 18 is a schematic representation of the aircraft of FIG. 1 transitioning from rotary wing flight mode, through the transition envelope and into fixed wing flight mode.
Figure 19:
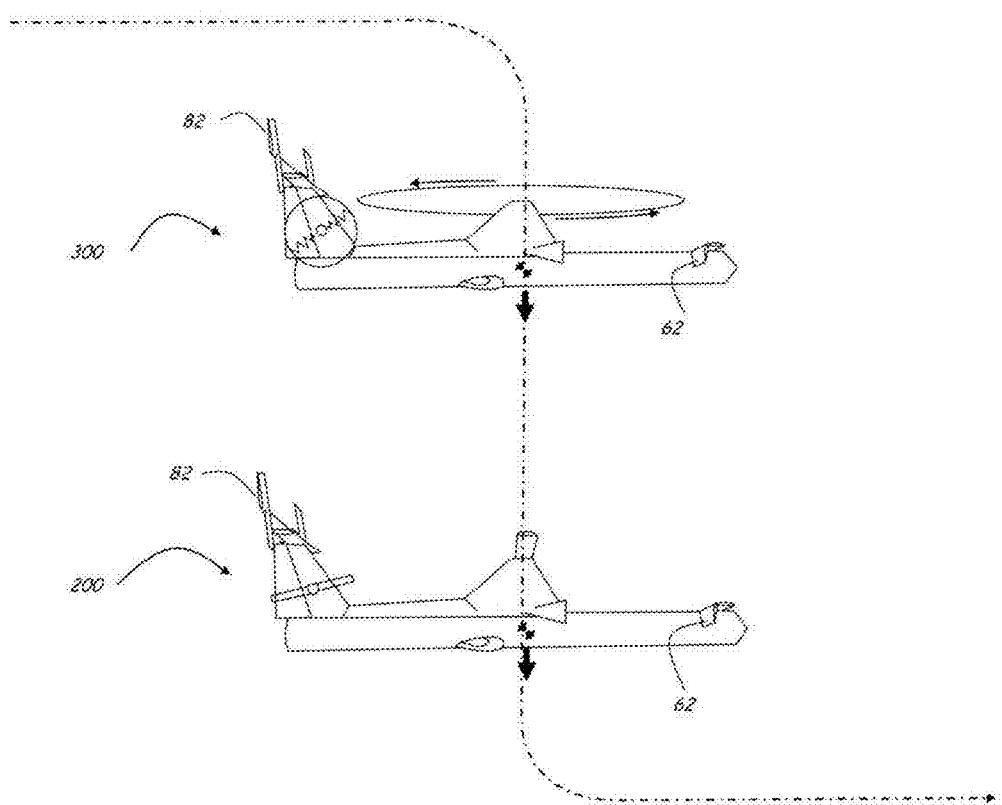
FIG. 19 is a schematic representation of the aircraft of FIG. 1 in transition from rotary wing flight mode to fixed wing flight mode

Referring to FIG. 17, sufficient altitude 502 is required prior to starting the conversion form rotary to fixed wing flight mode. Referring to FIG. 18, once sufficient altitude is achieved, a deceleration is made 504, normally level, until airspeed reaches zero. Entry into the transition envelope 320 is achieved by holding a level attitude and entering a vertical descent 506. As the descent commences, the flight mode is set to transition, the control surfaces 62 and 82 are set to full up travel and held there. In this mode, collective cyclic inputs to the rotor system have no input to the other control surfaces. Progressive positive collective pitch 508 is applied to aerodynamically stall the main rotor 40. The resultant drag 57 acts in opposition to the rotational airflow of the main rotor 40, and causes it to slow rapidly (FIG. 6b). As main rotor RPM decays, the aircraft 10 stays stable in the transition envelop 320 with the relative airflow substantially aligned with the main rotor rotation axis 44. Similar to the example given above, the aircraft 10 is held in the transition flight mode, by the forces generated by the non-rotating control surfaces, canard 60 and its elevon control surfaces 62, the tail 70, rudder 72, horizontal stabilizer 80 and its elevon control surfaces 82 and the dorsal faring 94.

Collective pitch is used to fly the main rotor 40 to a stop aligned it with the lateral axis 17 of the aircraft 10, at which point the rotor locking mechanism 48 is engaged to lock and prevent any further rotation. The flight mode switch is set to fixed wing operations, which sets the control surfaces 62 and 82 back to normal modes of operation, where they respond to pitch and roll inputs. Control inputs for roll are sent to the collective pitch control which acts to change incidence on the main rotor 40, but as it is now locked in alignment with the lateral axis 17 of the aircraft 10 and cannot rotate, the change in incidence now gives a response in roll when in forward flight.

Recovery from the transition profile 510 is achieved, with or without application of power from the supplemental thrust means 90, by a smooth reduction in pitch inputs to the control surfaces 62 and 82, resulting in reduction of the angle of attack below the critical stall angle on the canard 60 and the stabilizer 80 and therefore reattachment of the airflow and return to normal fixed wing flight 512. As in any stall recovery manoeuvre, some height loss will result during this process. A reduction in height loss can be achieved by application of thrust via the supplemental forward thrust means 90. In both cases of powered and unpowered flight, control response is maintained and the aircraft 10 is flown away from the transition as a fixed wing aircraft 200.

At the completion of the mission a landing can be made as a conventional fixed wing aircraft or conversion back to rotary wing flight is available. There are many mission profile combinations that are possible with this embodiment, and payloads 600 are customizable to the desire of the operator.

Alternative Main Rotor Configuration—Configuration Using Large Incidence Rotor (LIR)

Figure 22:
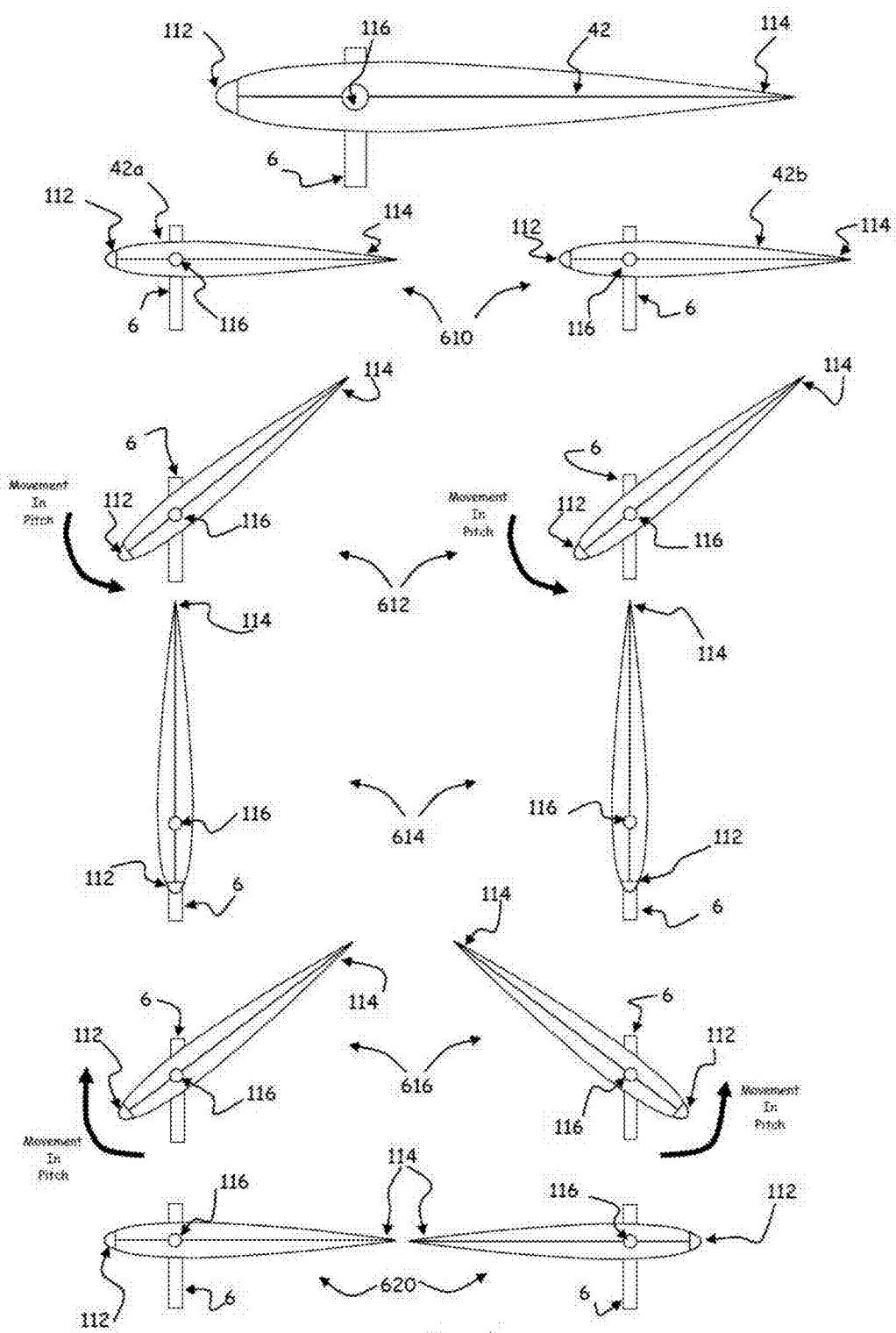

FIG. 22 shows an alternative main rotor airfoil configuration, which uses standard symmetrical airfoil section rotor blades 42a and 42b, commonly used on helicopters. In this configuration, the rotor blades 42 are attached to a hub 33 such that their leading edges 112 face generally opposing directions for use of the main rotor 40 as a rotary wing 620. The feathering axis 116 of each blade 42 is disposed generally about 25% of the distance from the leading edge 112 to the trailing edge 114. This results in a stable airfoil. The blades 42 have means for collective and cyclic pitch control to allow function as a main helicopter rotor.

For use in the aircraft 10 as a fixed wing 610, the control system 46 allows the orientation of one rotor blade 42b to be inverted compared to its orientation in helicopter mode. This orientation puts it in symmetrical alignment with the opposite blade 42a, and when the rotor 40 is locked in alignment with the aircraft lateral axis 17 it forms fixed wing flying surfaces. In this configuration both leading edges 112 are orientated toward the oncoming airflow.

In fixed wing flight mode the main rotor 40 operates as a set of variable incidence fixed wings.

The transition from fixed wing to rotary wing flight is achieved by operation of the control surfaces 62 and 82 on the canard 60 and stabilizer 80 to fly the aircraft 10 into the transition envelope 320.

During this process the rotor blades 42 can either be flown to maintain alignment with the airflow resulting in the leading edge 112 of the airfoil progressively pitching down 612 to maintain alignment with the relative airflow until feathered in alignment 614 with the rotation axis 44. Alternatively, the airfoils are maintained substantially as fixed wings thereby entering a stalled state as the aircraft stabilises in the transition envelope. The control system then feathers the airfoils to be in alignment 614 with the rotation axis 44. This method creates increased vertical drag. To complete the conversion, the control system moves the airfoils with their leading edges 112 down to be aligned with the rotor's rotation axis 44.

Once aligned with the rotation axis 44 with their leading edges 112 facing down, the rotor locking mechanism 48 is moved to unlock the rotor 40, flight mode is set to rotary wing mode and one airfoil 42b is rotated past the vertical 616 to a conventional helicopter rotor blade configuration where the leading edges 112 face opposite directions 620. As a result, aerodynamic forces cause both rotor blades 42 to commence rotation about the rotor's rotation axis 44.

As rotor RPM increases, cyclic pitch becomes effective and collective pitch is used to control rotor RPM. The aircraft 10 now operates as a rotary wing aircraft and can be flown out of the transition envelope 320.

The transition from rotary wing mode to fixed wing mode is achieved by slowing the aircraft 10 to minimum forward speed. At this point the flight control system is set to conversion mode where the control surfaces 62 and 82 are positioned to control the aircraft in the transition envelope 320. Power is then removed from the main rotor 40 causing the aircraft to commence entry into the transition envelope 320. Once stable, collective pitch is applied to the main rotor 40 which results in aerodynamic stalling of the rotor blades 42. The resultant drag causes rapid deceleration. As the rotor RPM approaches zero, collective pitch is operated to feather the airfoils to be in alignment 614 with the rotation axis 44 of the rotor 40. At this point the airfoils are operated to align the rotor 40 with the lateral axis 17 of the aircraft 10 and the rotor lock mechanism 48 is engaged to lock the rotor blades 42 as fixed wing. At this point the aircraft 10 can commence recovery from the transition envelope 320 and at the same time the control system via collective pitch moves the rotor blades 42 such that both leading edges 112 are orientated 610 toward the nose of the aircraft 10 for fixed wing flight.

Inversion of one of the blades 42 for either rotary or fixed wing flight mode can be performed using any suitable mechanical or electro mechanical means, such as a servo-motor.

Flight Controls

Modern aircraft designs take advantage of the power of computers. The modern computer has revolutionized the aircraft industry by allowing control configurations that would otherwise be impossible or extremely difficult and costly to implement using mechanical means. Computerized flight controls are known as Fly-by-Wire control systems, where control inputs are modified by computers to provide a specific output to the control surfaces.

Fly by wire versions will have dedicated configuration settings where rotor cyclic inputs are separated from canard and stabilizer inputs, therefore allowing the main rotor to maintain neutral cyclic control inputs while the conversion takes place. The control surfaces will be used, as they are currently, to hold the machine in the conversion configuration, thereby allowing the main rotor to start or stop rotation without creating pitch or roll disturbances.

Flight controls are programmed to maintain standard control inputs between the multiple modes of operation.

For the symmetrical airfoil (LIR) rotor version, conventional symmetrical airfoils are Used. An example of this being the NACA 0012 profile which has been used on many production helicopters. These airfoils are unstable when flying backwards and require a different control configuration to allow the airfoils to keep their leading edges substantially aligned into the relative airflow.

Only one side of the main rotor 40 is required to invert its rotor blade 42 orientation to convert from fixed wing mode to rotary wing modes of operation or from rotary wing mode to fixed wing mode.

To be able to use a symmetrical airfoil as a fixed wing, the leading edge of the airfoil must be pointing into the relative airflow; otherwise it is unstable and will try to align itself with the airflow. The control system in the embodiment will allow a symmetrical airfoil equipped main rotor to feather into the relative airflow during transition and then invert the orientation on one side of the rotor to allow it to match the opposite side for fixed wing operations.

Computerized flight controls allow electronic phasing to be applied to the symmetrical airfoil rotor version when in rotary wing mode of operation. In either embodiment, computerized flight controls allow customized tailoring of each flight control surface. This can be done internally with onboard computers or from a ground based control system.

The preferred embodiment thus provides an aircraft capable of controlled stable flight at high angles of attack. The aircraft is capable of achieving a relative airflow of substantially 90 degrees to the longitudinal axis of the aircraft thereby aligning the airflow with the rotation axis of the main rotor. In this mode of flight the rotor is either stopped or started using aerodynamic forces.

This configuration results in a flight profile that is a paradigm shift from the prior art. The aircraft of the preferred embodiment is able to capitalise on the benefits of fixed and rotary wing flight. The preferred embodiments provide a multi-mode vertical, short, conventional takeoff and landing (VSCTOL) capable aircraft. The aircraft of the preferred embodiment can be operated in different modes of operation include fixed wing, transition phase, autogiro, helicopter and compound helicopter. It is also possible to convert from one mode to another on the ground prior to flight.

The preferred embodiment thus provides a solution to the challenges of converting a conventionally designed fixed wing or rotorcraft from fixed wing to rotary wing or rotary wing to fixed wing modes of flight by approaching the technical challenge in a way that has not been proposed by any prior art.

Figure 23:
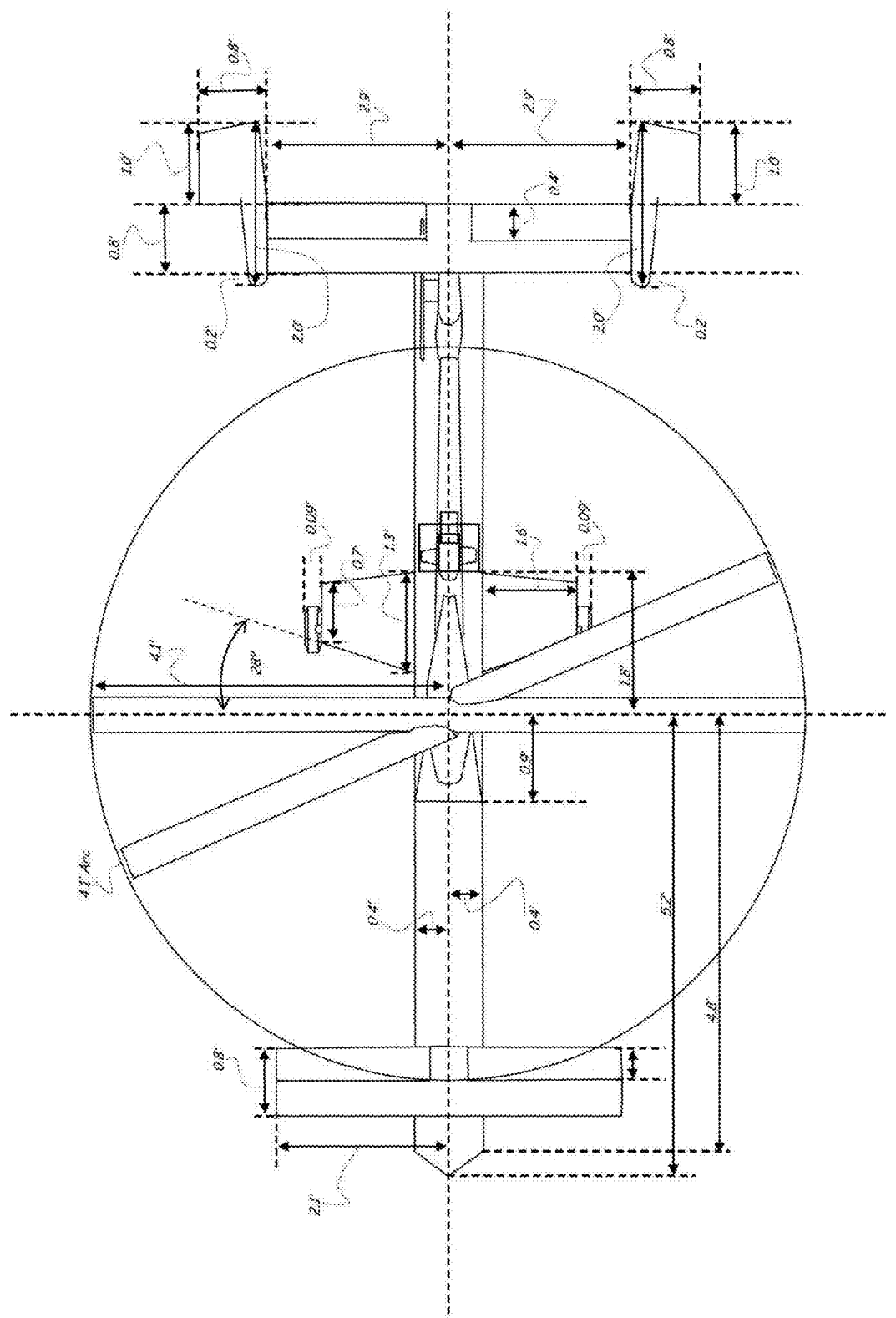
FIG. 23 is a top view of the aircraft of FIG. 1 showing example dimensions for the aircraft when configured as a small UAV.
Figure 24:
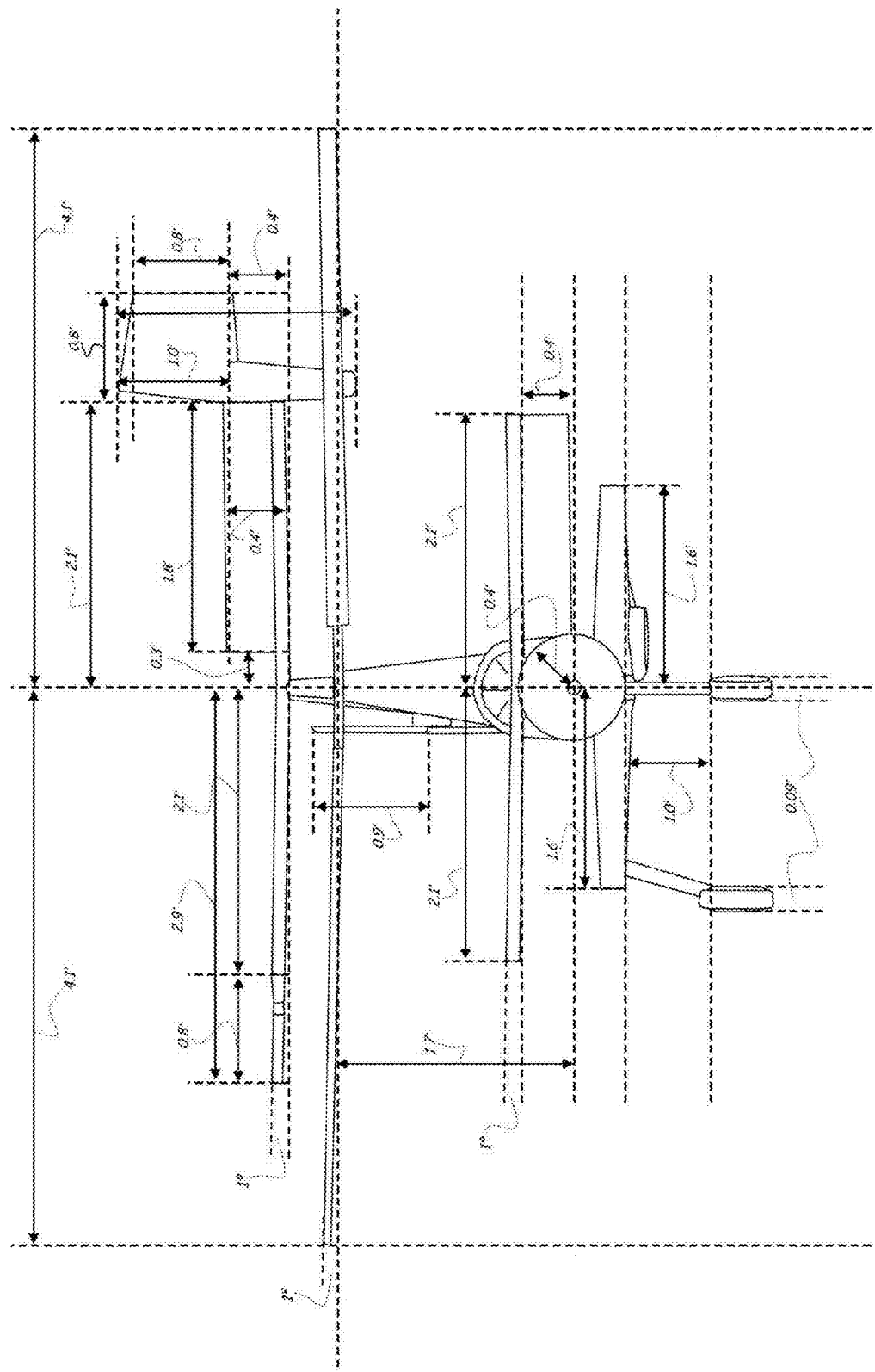
FIG. 24 is a front view of the aircraft of FIG. 23 showing example dimensions.
Figure 25:
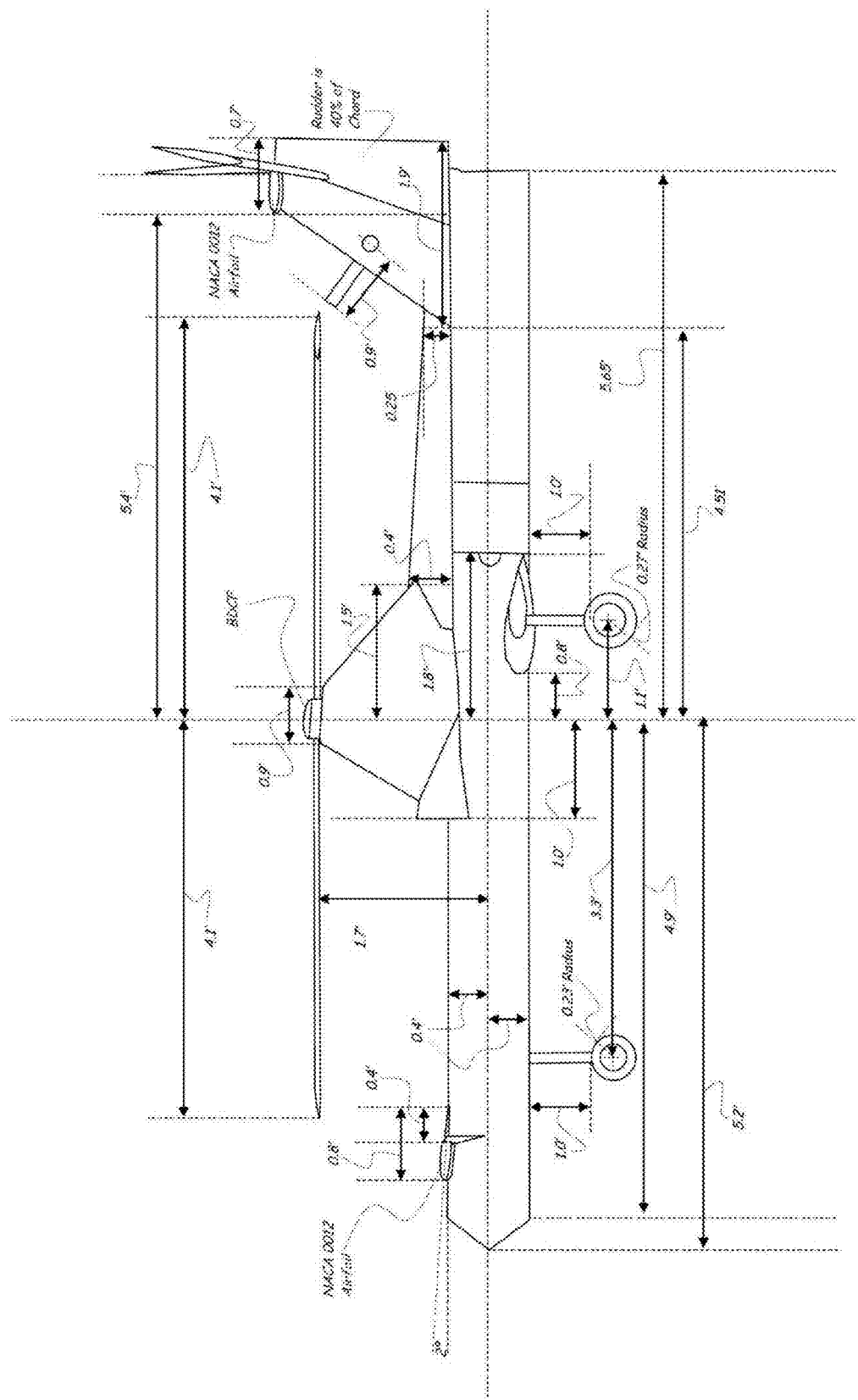
FIG. 25 is a side view of the aircraft of FIG. 23 showing example dimensions.

FIGS. 23 to 25 show example dimensions of the aircraft 10 configured as a large radio controlled machine (RC) or Unmanned Aerial Vehicle (UAV). It is clear however that the aircraft 10 can be made in any size as desired, including as passenger sized aircraft.

Figure 26:
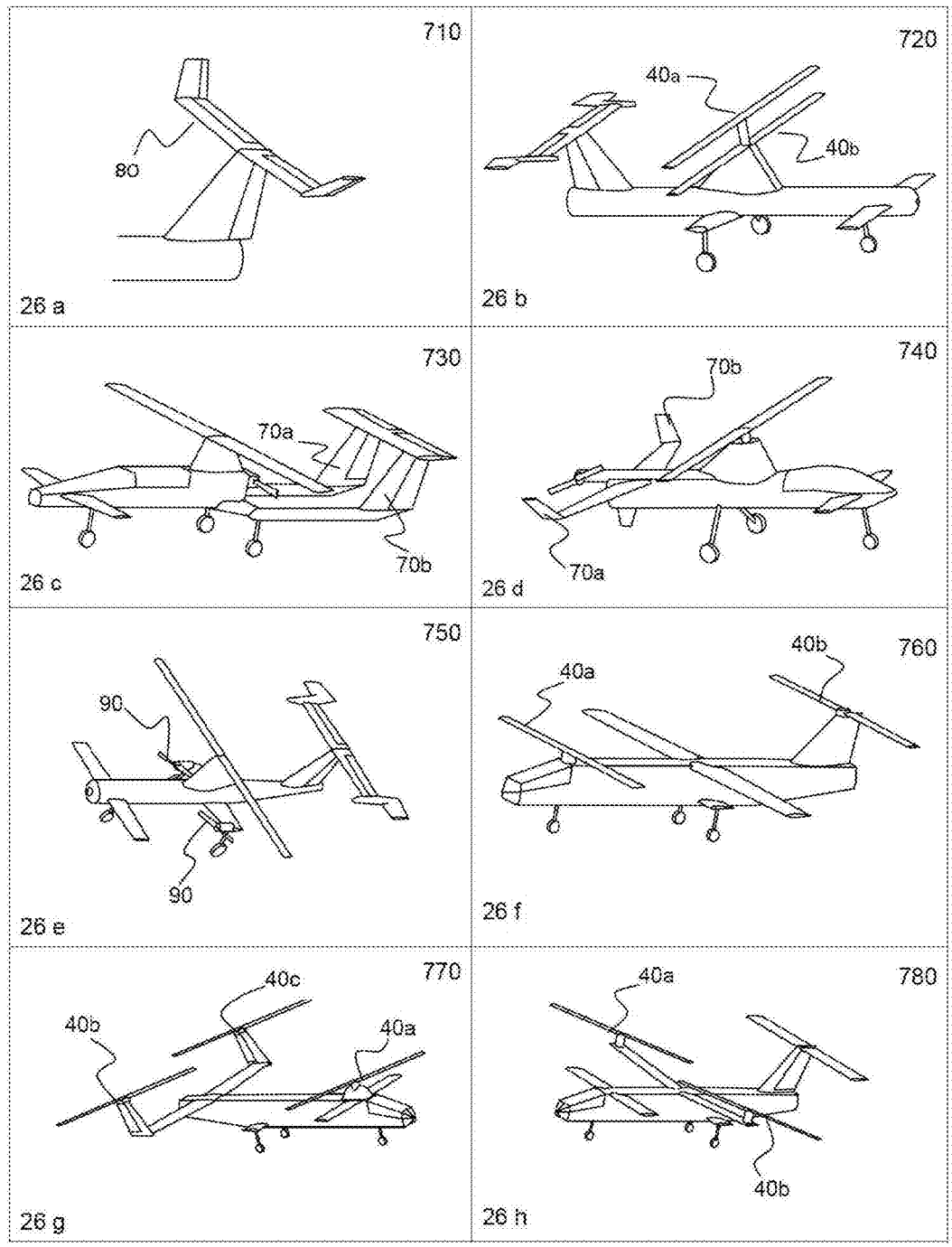
FIG. 26 schematically show perspective views of modified embodiments of the aircraft in accordance with the present invention.

Whilst preferred embodiments of the present invention have been described, it will be apparent to skilled persons that modifications can be made to the embodiments described. For example, FIG. 26 shows alternative embodiments of the aircraft 10 including:

710—an alternative horizontal stabilizer configuration 80
720—co-axial rotors 40*a* and 40*b*
730—twin boom tails 70*a* and 70*b*
740—twin fin tails 70*a* and 70*b* with body mounted stabilizer/wing
750—alternative propeller engines 90
760—tandem rotor, front main rotor 40*a* and rear main rotor 40*b*
770—heavy lift tri rotor, front main rotor 40*a* and first and second lateral rear main rotors 40*b* and 40*c*
780—heavy lift twin rotor, first and second lateral main rotors 40*a* and 40*b*.

In each of the above embodiments, the main rotor(s) can be stopped and adapted to be symmetrical relative to the longitudinal axis of the fuselage.

Other modifications can be made to the aircraft 10. For example, the aircraft can comprise means for varying its centre of gravity, such as a movable weight disposed within the fuselage. The anti-torque control means can be any form of anti-torque device such as a tail rotor, deflected engine exhaust or boundary layer control systems.

Modified Horizontal Stabilizer

Figure 27:
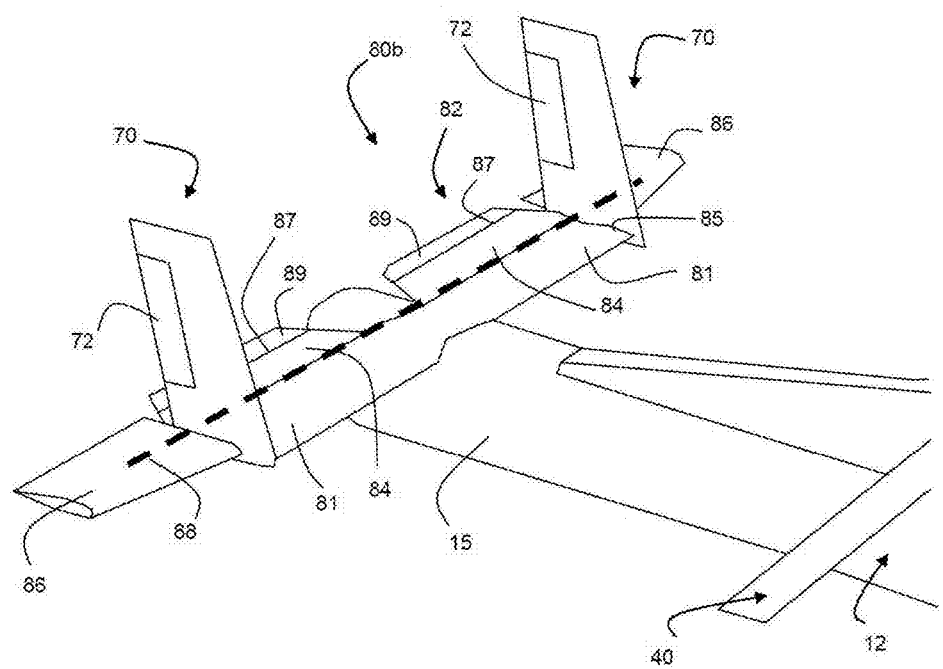
FIG. 27 is a schematic perspective view of a modified horizontal stabilizer for the aircraft.
Figure 28:
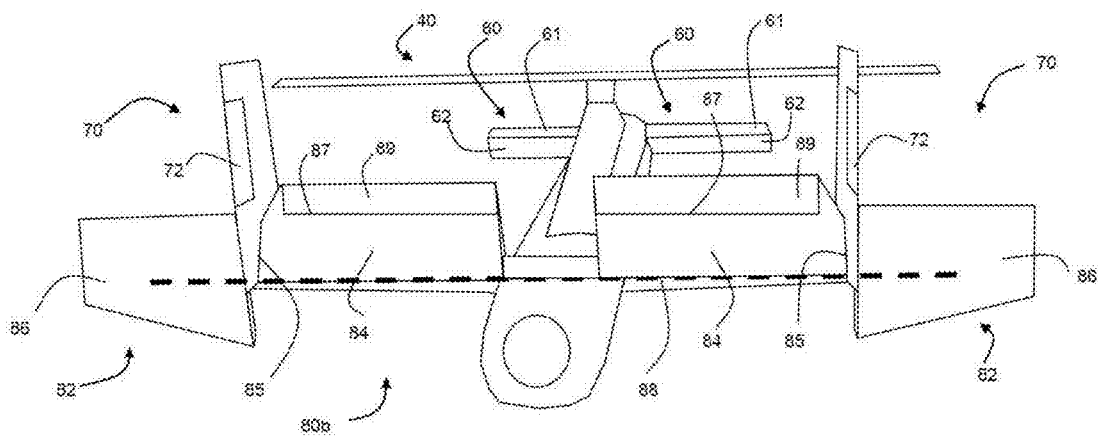
FIG. 28 is a schematic rear perspective view of the modified aircraft of FIG. 27.

FIGS. 27 and 28 show a modified horizontal stabilizer 80*b*. The stabilizer 80*b* is a variation on the T-Tail design stabilizer 80 described above. The modified stabilizer 80*b* is attached to the fuselage aft portion 15 and in this embodiment comprises twin vertical tails 70.

In the T-Tail design stabilizer 80, the inner portion 84 and extended portion 86 of each control surface 82 move together as one unit. The left and right side control surfaces 82 move independent of each other, to control the aircraft 10 throughout its flight envelope. This includes normal operations and in the transition flight mode.

The size and power of these control surfaces 82 are a requirement for entering, control in and exit from the transition flight mode, but for normal operations, they provide more control authority than is required.

In the modified stabilizer 80b, both left and right sides similarly comprise a fixed front flying surface 81 and a pivotable control surface 82, but each side also comprises a smaller elevon 89.

The control surfaces 82 each similarly comprises an inner portion 84 extending within the lateral extremities 85 of the fixed front flying surface 81, and an extended portion 86 disposed laterally beyond the lateral extremities 85 of the fixed front flying surface 81. The vertical tails 70 are respectively disposed at the lateral extremities 85 of the fixed front flying surface 81 and each comprises a conventional aircraft rudder 72.

The inner portions 84 are hinged about a hinge line 88 extending along the rear of the fixed front flying surface 81 which remains stationary and provides the same vertical drag as the fixed front flying surface 61 of the canard 60.

The extended portions 86 are full flying control surfaces which extend fore and aft of the hinge line 88, and are respectively disposed laterally of the vertical tails 70. Each extended portion 86 is pivotable about the hinge line 88 with its adjacent inner portion 84, with a range of travel of 90 degrees up and 40 degrees down.

The elevons 89 are respectively disposed at the trailing edge 87 of each inner portion 84. The elevons 89 do not require a large range of travel, and each is pivotably mounted with a reduced range of travel of approximately ±30° relative to its respective inner portion 84.

The modified stabilizer 80b is a refinement of the control system where the stabilizer 80b is used for trim in normal flight, with the pitch and roll control being provided by smaller elevons 89. The elevons 89 work in concert with the canard 60 and main rotor 40 inputs as in the T-Tail version.

When the aircraft 10 is ready to enter the transition flight mode, the controls are set to move the stabilizer control surfaces 82 to their transition displacement position, that being an incidence of approximately 90° up. When the control surfaces 82 are pivoted about the hinge line 88, the extended portions 86 are operating in smooth airflow outside of the turbulent airflow generated by the fixed front flying surface 81

Once this is achieved, the aircraft 10 will enter and stay in the transition flight mode profile until the stabilizer control surfaces 82 are reduced to the incidence for normal flight. The elevons 89 are moveable for trimming during the transition.

This stabilizer configuration allows precise control by the elevons 89 in normal flight.

Swept Wing

One of the main benefits of a Stop Rotor Aircraft is its ability to cruise at high speed and high altitude in fixed wing mode. This is where the defining difference between a Stop Rotor Aircraft and any other high speed rotary wing aircraft is realised.

With the rotor 40 stopped and locked to operate as a fixed wing, high speeds and altitudes are achievable. This results in many benefits, including but not limited to flight above the majority of weather, higher True Air Speeds (TAS), lower fuel consumption and longer range.

In its standard configuration, the rotor 40 will effectively have long straight wings (rotor blades 41) when the rotor 40 is in the locked, fixed wing position. A rotor 40 that has a high aspect ratio is more efficient as a Rotor and as a Wing in low speed flight, but results in a higher drag penalty with increasing Airspeed and Mach number in comparison to a swept wing.

The ability to vary the amount of "wing sweep" on the rotor 40 is preferred to truly benefit from the aircraft's ability for high speed flight. A swept rotor 40 would allow the aircraft 10 to cruise at higher Mach numbers compared to the standard straight rotor 40 configuration.

The preferred embodiment can use two possible methods of generating wing sweep on the rotor 40 when it is operating as a fixed wing.

Figure 29:
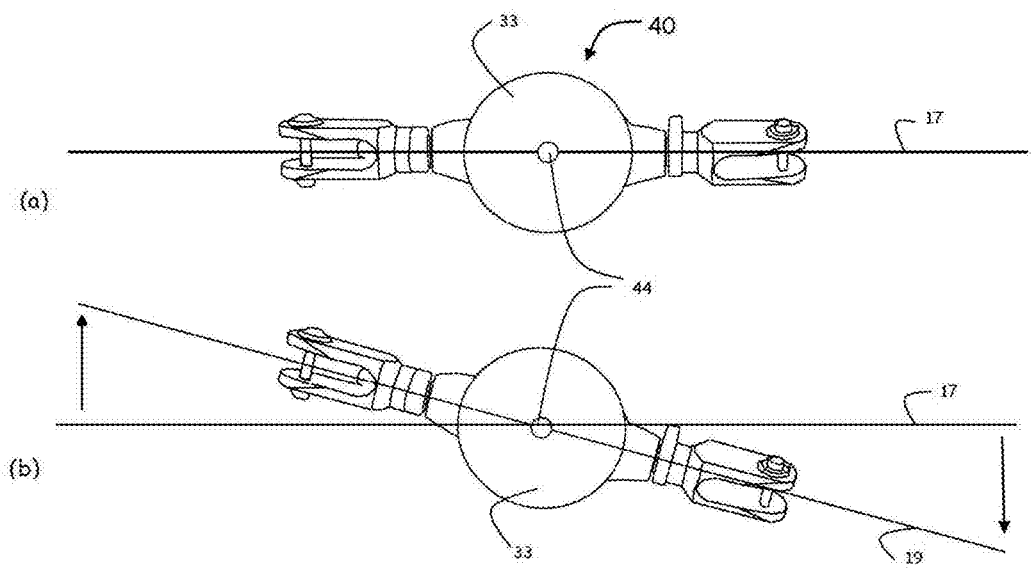
FIG. 29 is a top view of the rotor hub and blade grips showing the (a) laterally aligned and (b) laterally offset positions.

As shown in FIG. 29, the first method is to rotate the main rotor 40 around the rotation axis 44 of the rotor mast 32 using a stepper motor or similar drive mechanism, to align it at an angle 19 to the lateral axis 17 of the aircraft 10 and thereby at an angle to the relative airflow in fixed wing flight.

This idea was first proposed by Richard Vogt to be used on the German Blohm & Voss P. 202 of 1942 and later demonstrated by the Burt Rutan designed (Rutan Model 35) NASA Ames AD-1 (Ames Dryden-1) Oblique Wing (Scissor Wing) aircraft of 1979.

From Wikipedia:
Studies at the NASA Ames research facility indicated that a transport-size oblique-wing aircraft, flying at speeds up to Mach 1.4 (1.4 times the speed of sound), would have substantially better aerodynamic performance than aircraft with more conventional wings.

At high speeds, both subsonic and supersonic, the wing would be pivoted at up to 60 degrees to the aircraft's fuselage for better high-speed performance. The studies showed these angles would decrease aerodynamic drag, permitting increased speed and longer range with the same fuel expenditure.

The rotor 40 would then be set back to be aligned with the lateral axis 17 prior to entering the transition flight profile to convert to the aircraft's rotary wing modes of flight. Whilst this method provides advantages, it has one wing (blade 41) moving forward and one wing (blade 41) moving backward and there is instability associated with a forward swept wing.

The second method requires a more complex engineering solution, but would allow both rotor blades 41 to be swept backward. This is preferable compared to the first method above.

Figure 30:
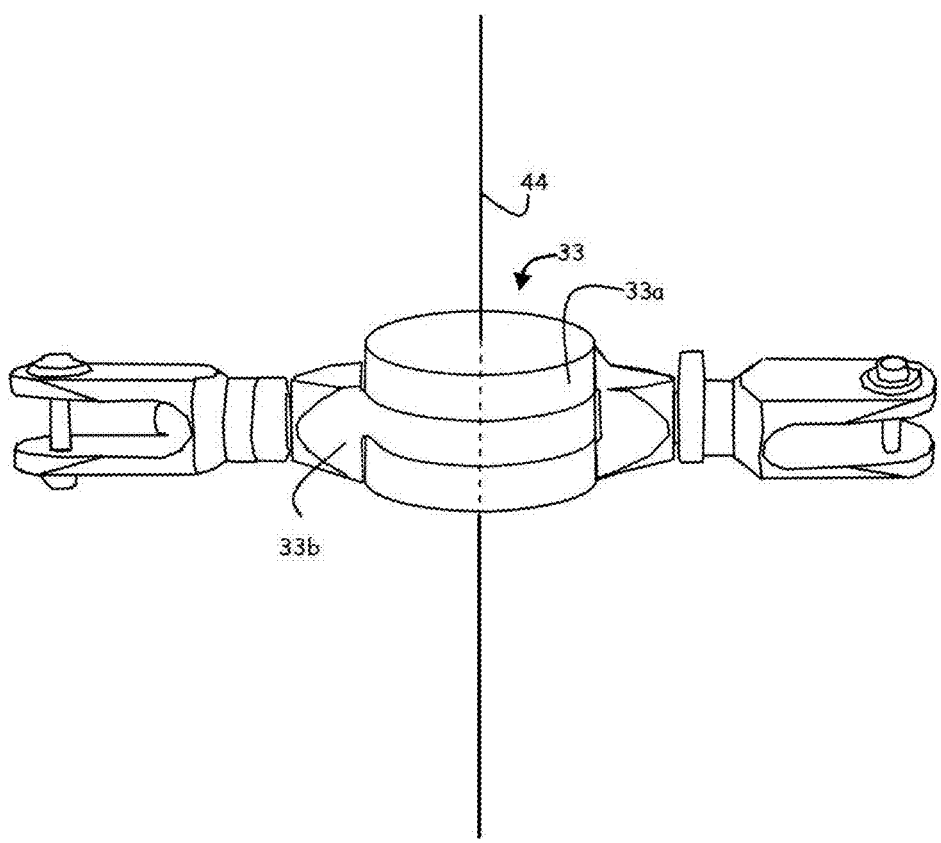
FIG. 30 is a front perspective view of a modified rotor hub and blade grips.
Figure 31:
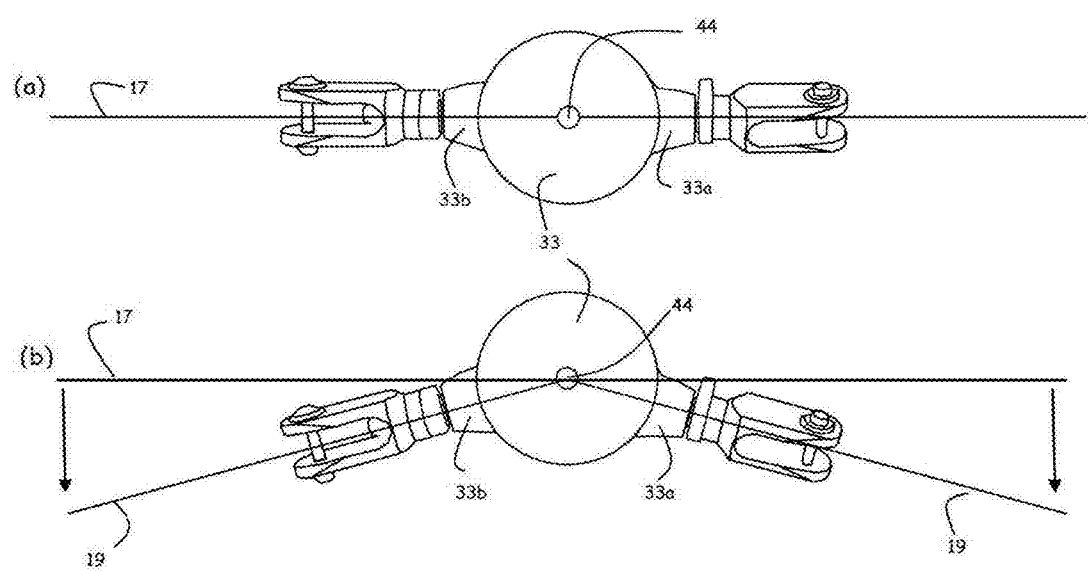
FIG. 31 is a top view of the modified rotor hub of FIG. 30 showing the (a) laterally aligned and (b) swept back positions.

As shown in FIGS. 30 and 31, to achieve this solution, each blade of the rotor 40 is attached to a separate concentric hub section 33a and 33b that allows the respective blades 41 to be moved independently of each other about the rotation axis 44.

In rotary wing modes of operation, both blades 41 are positioned aligned with each other and the lateral axis 17 (FIG. 31(a)). They are held in this position by a locking mechanism.

Once the aircraft 10 has converted from rotary wing flight to fixed wing flight, the blades 41 can be unlocked and moved aft to a respective swept angle position 19 (FIG. 31(b)) for efficient high speed cruising flight.

Sweeping the blades 41 aft allows the use of more flexible blades that have advantages in both rotary and fixed wing flight.

Figure 32:
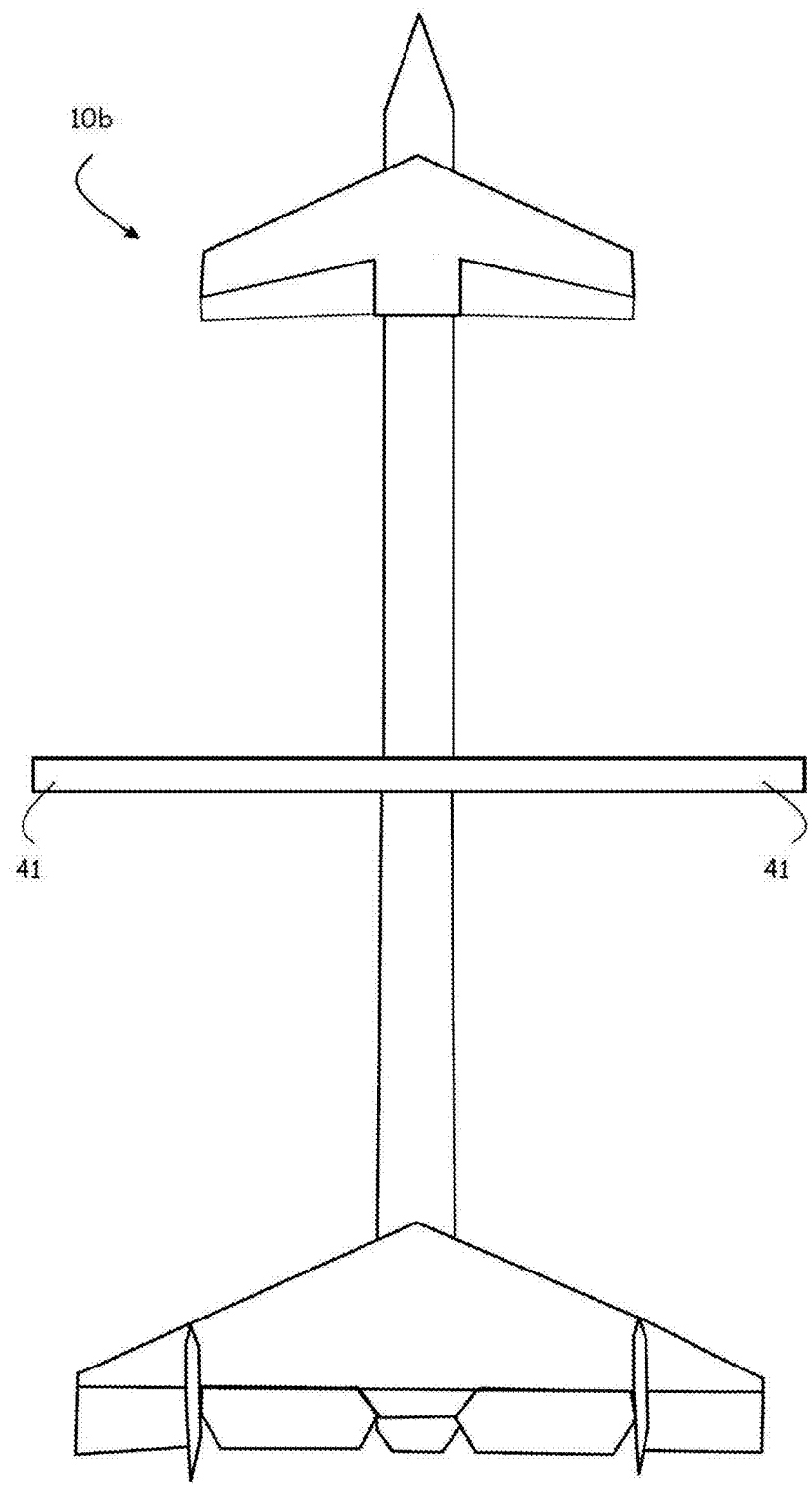
FIG. 32 is a top view of an example aircraft with flying surfaces movable to the swept position, with the rotor blades in normal flight position.

FIG. 32 shows an example aircraft 10b with flying surfaces movable to the swept position, with the rotor blades 41 in normal flight position aligned with the lateral axis 17.

Figure 33:
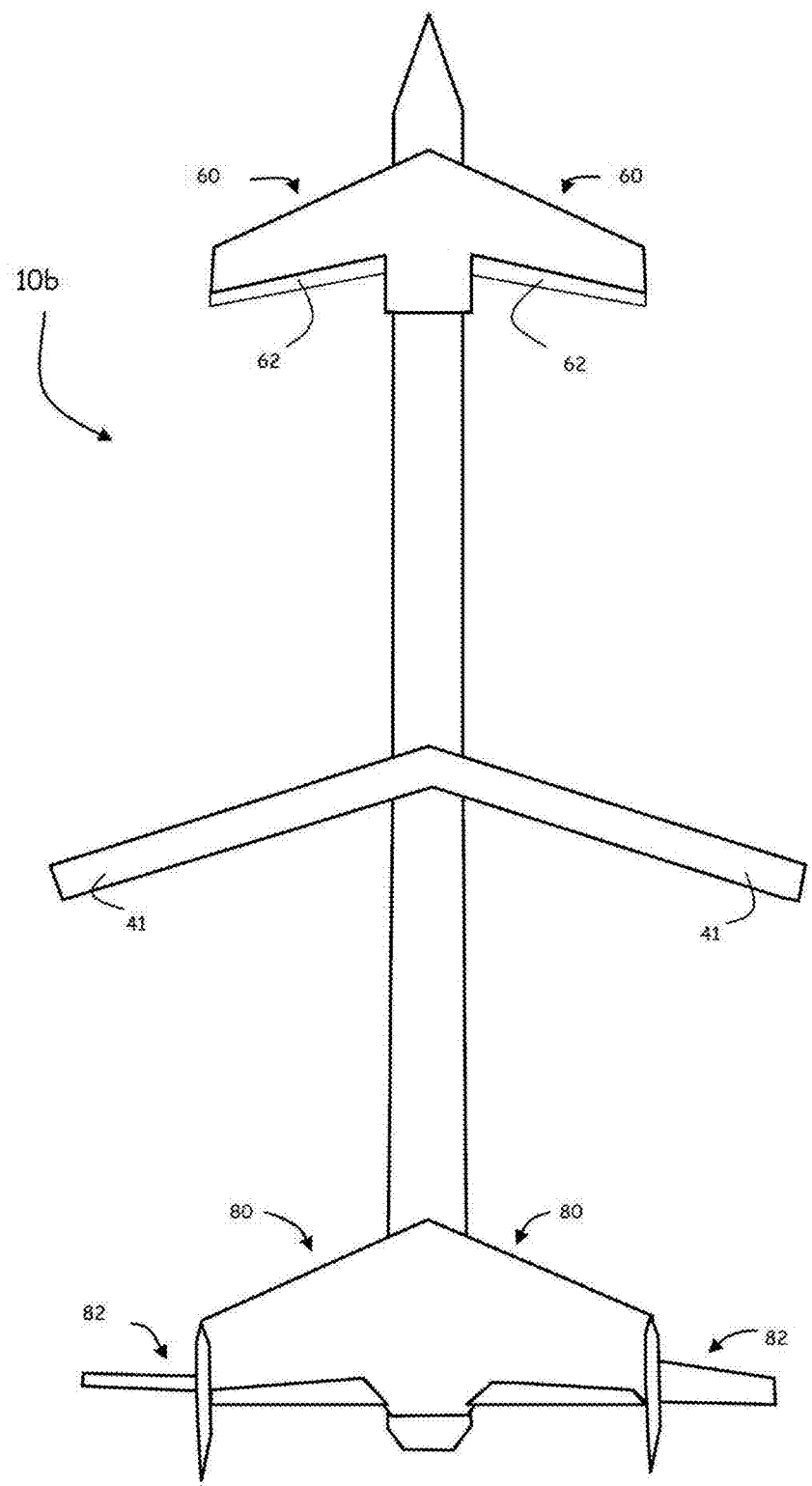
FIG. 33 shows the aircraft of FIG. 32 with the rotor blades in the swept position and with the canard and stabilizer control surfaces in the transition phase configuration.

FIG. 33 shows the aircraft 10b with the rotor blades 41 in the swept position and with the canard and stabilizer control surfaces 62 and 82 in the transition configuration. It is to be noted that having swept rotor blades 41 and the control surfaces 62 and 82 in the transition configuration would not be performed at the same time. FIG. 33 merely shows the control movements for illustration purposes only. In a possible modification, the aircraft can comprise one or more control surfaces combined with a vectored thrust means for stabilizing the aircraft in the transition flight profile where the relative airflow is substantially aligned with the rotation axis of the rotor and controlling the aircraft to travel in this sustained flight profile. The vectored thrust means can be one or more additional direction controllable thrust means, or they can be diverted thrust lines of the forward thrust means 90 and/or the anti-torque means 91.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.
Different Instances of Objects As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.
Specific Details In the description provided herein, numerous specific details are set forth. However, it is understood that embodiments of the invention may be practiced without these specific details. In other instances, well-known methods, structures and techniques have not been shown in detail in order not to obscure an understanding of this description.

TERMINOLOGY

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.
Comprising and Including In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.
Scope of Invention Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the aircraft industries.

The invention claimed is:

1. An aircraft capable of a rotary wing flight mode and a fixed wing flight mode and capable of transitioning in-flight via a transition flight mode wherein the aircraft transitions in-flight between a one of said rotary wing flight mode and said fixed wing flight mode; said aircraft comprising:
   a thrust device for imparting thrust to said aircraft;
   a fuselage having a longitudinal axis which is perpendicular to a vertical axis of the aircraft;
   the fuselage having a lateral axis which is perpendicular to the longitudinal axis and the vertical axis;
   at least one helicopter main rotor operably mounted to the fuselage with its rotational axis mounted substantially aligned with the vertical axis of the aircraft;

the at least one helicopter main rotor comprising rotor blades rotatable about its said rotational axis, and wherein the rotor blades can be stopped in-flight;

the aircraft having at least one control device operable in said transition flight mode in-flight between a one of said rotary wing flight mode and said fixed wing flight mode; said control device orientating the aircraft to travel with a relative airflow to the entire aircraft, in-flight; said relative airflow substantially aligned with the rotational axis of the at least one helicopter main rotor and in an upward direction relative to the aircraft, the at least one control device also acting to stabilize and control said aircraft during the transition in-flight between a one of said rotary wing flight mode and said fixed wing flight mode.

2. The aircraft of claim 1, wherein said aircraft includes said thrust device for providing forward thrust when in said fixed wing flight mode; said thrust device supplementing forward thrust provided by said rotor when said aircraft is operating in said rotary wing flight mode.

3. The aircraft of claim 1 wherein said control device comprises a control surface.

4. The aircraft of claim 1 wherein said control device comprises the thrust device.

5. The aircraft of claim 1 wherein the at least one helicopter main rotor is stopped during at least a portion of the transition flight mode.

6. The aircraft of claim 1 wherein during the transition flight mode said relative airflow acts such that drag becomes the predominant aerodynamic force acting on the aircraft to stabilize the aircraft in the transition flight mode.

7. The aircraft of claim 1 wherein the at least one helicopter main rotor blades can be stopped in-flight and adapted to provide fixed wing surfaces aligned substantially with the lateral axis.

8. The aircraft of claim 1 wherein the at least one control device can control the aircraft to travel in the transition flight mode when in fixed wing or rotary wing flight.

9. The aircraft of claim 1 wherein the at least one helicopter main rotor can be rotated from a stopped position when in the transition flight mode.

10. The aircraft of claim 1 further comprising a configuring device for configuring at least one of the rotor blades between the asymmetrical and symmetrical configurations.

11. The aircraft of claim 10 wherein the configuring device moves the rotor blade(s) with the leading edge(s) of the rotor blade(s) pitching downward into the relative airflow during the said transition flight mode.

12. The aircraft of claim 1 further comprising at least one fixed wing mounted to the fuselage wherein the at least one fixed wing acts to provide lift during forward flight, and acts such that drag becomes the predominant aerodynamic force to stabilize the aircraft during the transition flight mode.

13. The aircraft of claim 1 is capable of sustained flight in the transition flight mode subject to entry altitude and or velocity.

14. The aircraft of claim 1 where a horizontal stabilizer and the at least one control device is located above the main rotor relative to the fuselage and thereby produces moments that result in a stable flight profile in the transition flight mode.

15. The aircraft of claim 14 wherein left and right sides of the horizontal stabilizer each comprise a fixed inner portion and a pivotable outer control portion, each outer portion containing a smaller elevon control surface at its trailing edge.

16. The aircraft of claim 15 wherein the pivotable outer control portion of the stabilizer with a range of travel of at least 90 degrees trailing edge up and 40 degrees trailing edge down.

17. The aircraft of claim 15 wherein the smaller elevon control surfaces have a range of travel of about plus or minus 30 degrees relative to its respective pivotable outer control portion.

18. The aircraft of claim 15 wherein the pivotable outer control portions inclusive of their respective elevon control surface, have a larger surface area than their respective fixed left and right inner portions.

19. A method of operating an aircraft capable of a rotary wing flight mode, a fixed wing flight mode and a transition flight mode wherein the aircraft transitions in-flight between a one of said rotary wing flight mode and said fixed wing flight mode, the aircraft having at least one helicopter main rotor rotatable about a rotation axis substantially aligned with a vertical axis of the aircraft;

and wherein the aircraft transition flight mode is entered by an at least one control device operating to orientate the aircraft to travel with a relative airflow to the entire aircraft, in flight, substantially aligned with the rotational axis of the at least one helicopter main rotor and in an upward direction relative to the aircraft, the method comprising:

operating the aircraft in one of the rotary wing and fixed wing flight modes;

entering into the transition flight mode;

stabilizing the aircraft by operation of said at least one control device to travel in the transition flight mode and starting the helicopter main rotor if transitioning from fixed wing flight mode to rotary wing flight mode stopping the main rotor if transitioning from rotary wing flight mode to fixed wing flight mode exiting the transition flight mode;

operating the aircraft in the other of the rotary wing and fixed wing flight modes thereby to complete the transitioning between a one of said rotary wing flight mode and said fixed wing flight mode.

20. The method of claim 19 wherein during the transition flight mode said relative airflow acts on a canard and fixed portions of a horizontal stabilizer of the aircraft, such that drag is the predominant aerodynamic force, stabilizing the aircraft in the transition flight mode.

21. The method of claim 19 wherein the aircraft comprises at least one helicopter main rotor, the method further comprising using the relative airflow in transition flight mode for aerodynamically starting and stopping the main rotor.

* * * * *